(12) United States Patent
Peng et al.

(10) Patent No.: US 12,169,601 B2
(45) Date of Patent: Dec. 17, 2024

(54) STYLUS AND ELECTRONIC DEVICE ASSEMBLY WITH ENHANCED ARRANGEMENT OF COMPONENTS

(71) Applicant: HONOR DEVICE CO., LTD., Shenzhen (CN)

(72) Inventors: Yongfeng Peng, Shenzhen (CN); Yong Zhao, Shenzhen (CN); Xin Mou, Shenzhen (CN)

(73) Assignee: HONOR DEVICE CO., LTD., Shenzhen (CN)

( * ) Notice: Subject to any disclaimer, the term of this patent is extended or adjusted under 35 U.S.C. 154(b) by 0 days.

(21) Appl. No.: 17/788,232

(22) PCT Filed: Feb. 9, 2022

(86) PCT No.: PCT/CN2022/075648
§ 371 (c)(1),
(2) Date: Jun. 22, 2022

(87) PCT Pub. No.: WO2022/247347
PCT Pub. Date: Dec. 1, 2022

(65) Prior Publication Data
US 2024/0168572 A1    May 23, 2024

(30) Foreign Application Priority Data

May 24, 2021 (CN) .......................... 202110566502.0

(51) Int. Cl.
*G06F 3/0354* (2013.01)
*G06F 3/02* (2006.01)
(52) U.S. Cl.
CPC ........ *G06F 3/03545* (2013.01); *G06F 3/0202* (2013.01)

(58) Field of Classification Search
CPC .................................................. G06F 3/03545
See application file for complete search history.

(56) References Cited

U.S. PATENT DOCUMENTS

| 10,007,364 B2 | 6/2018 | Zimmerman et al. |
| 2003/0063943 A1 | 4/2003 | Lapstun et al. |

(Continued)

FOREIGN PATENT DOCUMENTS

| CN | 202815746 U | 3/2013 |
| CN | 104615278 A | 5/2015 |

(Continued)

*Primary Examiner* — Chun-Nan Lin
(74) *Attorney, Agent, or Firm* — WOMBLE BOND DICKINSON (US) LLP

(57) ABSTRACT

This application provides a stylus and an electronic device assembly. With a mainshaft and a pressure sensor assembly disposed in the stylus, one end of the mainshaft connected to a tip assembly, and the pressure sensor assembly fixed in a barrel assembly and touching the other end of the mainshaft, the tip assembly moves under a pressure and drives the mainshaft to move, the mainshaft transfers the pressure on the tip assembly to the pressure sensor assembly, and the pressure sensor assembly detects the pressure on the tip assembly. With a second electrode fitting around a signal board, the moving of the tip assembly can drive the first electrode and the second electrode to move synchronously so that relative positions of the second electrode and the first electrode remain unchanged, improving measurement accuracy of a tilt angle of the stylus relative to a touchscreen by the electronic device.

20 Claims, 16 Drawing Sheets

(56) References Cited

U.S. PATENT DOCUMENTS

| | | | |
|---|---|---|---|
| 2014/0078109 A1 | 3/2014 | Armstrong-Muntner | |
| 2014/0267147 A1* | 9/2014 | Buelow | G06F 3/03545 345/174 |
| 2015/0317001 A1* | 11/2015 | Ben-Bassat | G06F 3/03545 345/179 |
| 2015/0363012 A1* | 12/2015 | Sundara-Rajan | G06F 3/0441 345/179 |
| 2016/0162045 A1 | 6/2016 | Paul | |
| 2017/0052610 A1* | 2/2017 | Large | G06F 3/0485 |
| 2017/0068340 A1* | 3/2017 | Zimmerman | G06F 3/04162 |
| 2018/0011560 A1* | 1/2018 | Kamiyama | G06F 3/0383 |
| 2018/0260048 A1 | 9/2018 | Chang | |
| 2019/0339796 A1 | 11/2019 | An et al. | |
| 2020/0209992 A1 | 7/2020 | Kwak et al. | |

FOREIGN PATENT DOCUMENTS

| | | |
|---|---|---|
| CN | 106249922 A | 12/2016 |
| CN | 206363269 U | 7/2017 |
| CN | 108731850 A | 11/2018 |
| CN | 110399050 A | 11/2019 |
| CN | 111538425 A | 8/2020 |
| CN | 112306267 A | 2/2021 |
| CN | 113885716 A | 1/2022 |
| WO | 2013165466 A1 | 11/2013 |
| WO | 2015130013 A1 | 9/2015 |
| WO | 2018201317 A1 | 11/2018 |

* cited by examiner

STYLUS AND ELECTRONIC DEVICE ASSEMBLY WITH ENHANCED ARRANGEMENT OF COMPONENTS

This application is a national stage of International Application No. PCT/CN2022/075648, filed on Feb. 9, 2022, which claims priority to Chinese Patent Application No. 202110566502.0, filed on May 24, 2021. The disclosure of the aforementioned application is hereby incorporated by reference in its entirety.

TECHNICAL FIELD

This application relates to the field of terminal technologies, and in particular, to a stylus and an electronic device assembly.

BACKGROUND

With the explosive growth of electronic devices such as smartphones and tablet computers (Pad), more and more applications, for example drawing software, require touch with higher resolution. Therefore, styluses are becoming more and more widely used. By working principle, styluses are mainly divided into inductive styluses and capacitive styluses.

A stylus usually includes a barrel and a tip attached to one end of the barrel. Specifically, an inductive stylus is usually provided with an electrode, a pressure sensitive assembly, and a circuit board. The electrode for example may be disposed in the tip and the pressure sensitive assembly and the circuit board for example may be disposed in the barrel. Both the electrode and the pressure sensitive assembly are electrically connected to the circuit board. The circuit board provides a signal to the electrode and controls the electrode to transmit a signal to an electronic device for the electronic device to determine a position of the stylus. The pressure sensitive assembly typically includes a mainshaft, a pressure transfer member, and a strain gage. The mainshaft is connected to the tip, the pressure transfer member fits around the mainshaft, and the strain gage is attached to an end of the pressure transfer member facing towards the circuit board and is electrically connected to the circuit board. The mainshaft drives the pressure transfer member to deform, the strain gage detects a deformation force of the pressure transfer member and transmits the deformation force to the circuit board, and the circuit board detects a pressure on the tip based on the deformation force and controls thickness of lines written using the tip based on the pressure on the tip.

However, as an existing stylus transmits a pressure signal through a strain gage detecting a deformation force of a pressure transfer member, a large number of components are disposed in the stylus, complicating the manufacturing and assembling processes and leading to high costs.

SUMMARY

This application provides a stylus and an electronic device assembly such that fewer components are disposed in the stylus, simplifying manufacturing and assembling processes and resulting in low costs.

One aspect of this application provides a stylus, including a barrel assembly and a tip assembly, where the tip assembly is located at an end of the barrel assembly and a gap is present between the tip assembly and the barrel assembly.

The stylus further includes a first electrode, a second electrode, a signal board, a mainshaft, a pressure sensor assembly, a control board, and a flexible electrical connection assembly. One end of the first electrode is located at a writing end of the tip assembly and the signal board extends into the tip assembly and connects to the other end of the first electrode. The second electrode fits around the signal board and is electrically connected to the signal board.

The pressure sensor assembly is fixed in the barrel assembly. One end of the mainshaft is connected to the tip assembly and the other end of the mainshaft touches the pressure sensor assembly. The pressure sensor assembly is electrically connected to the control board. One end of the flexible electrical connection assembly is connected to the signal board, the other end of the flexible electrical connection assembly is electrically connected to the control board, and a bending part is present between the two ends of the flexible electrical connection assembly.

In the stylus provided in this application, the mainshaft and the pressure sensor assembly are disposed, one end of the mainshaft is connected to the tip assembly, and the pressure sensor assembly fixed in the barrel assembly and touching the other end of the mainshaft. The tip assembly moves under a pressure and drives the mainshaft to move, the mainshaft moves towards the barrel assembly and transfers the pressure on the tip assembly to the pressure sensor assembly, and the pressure sensor assembly detects the pressure on the tip assembly. In this way, a transfer manner of the pressure on the tip assembly is simplified so that fewer components are disposed in the stylus, simplifying manufacturing and assembling processes of the stylus and reducing costs of the stylus. In addition, this can improve the accuracy of detection of the pressure on the tip assembly, thereby improving writing resolution of the tip assembly.

With the signal board extending into the tip assembly and connecting to the first electrode located at the writing end of the tip assembly, a size of the first electrode is reduced, a distance between the first electrode and a touchscreen is shortened, and accuracy of positioning of the tip assembly of the stylus by an electronic device is improved. In addition, with the second electrode fitting around the signal board, the moving of the tip assembly can drive the first electrode and the second electrode to move synchronously so that relative positions of the second electrode and the first electrode remain unchanged, improving measurement accuracy of a tilt angle of the stylus relative to the touchscreen by the electronic device.

With the two ends of the flexible electrical connection assembly connected to the signal board and the control board respectively, signals can be transmitted between the signal board and the control board. In addition, with the bending part disposed between the two ends of the flexible electrical connection assembly, the bending part enables the flexible electrical connection assembly to have some extension allowance, preventing the flexible electrical connection assembly from being torn or damaged due to pulling when the tip assembly moves away from the barrel assembly, thereby ensuring long-term service performance of the flexible electrical connection assembly.

In a possible implementation, the pressure sensor assembly includes a pressure sensor and an electrical connecting member, where one side surface of the pressure sensor abuts against an end of the mainshaft, the electrical connecting member is connected to the other side surface of the pressure sensor, and the electrical connecting member is electrically connected to the control board.

In a possible implementation, central axes of the mainshaft and the pressure sensor both coincide with a central axis of the barrel assembly.

With the central axes of the pressure sensor and the mainshaft both coinciding with the central axis of the barrel assembly, a pressure on the tip assembly is transferred along a straight line to the pressure sensor, improving linearity and isotropy of the force. Therefore, accuracy of detection of the pressure on the tip assembly by the pressure sensor can be improved.

In a possible implementation, the pressure sensor assembly further includes a buffer, where the buffer fits onto a side surface of the electrical connecting member facing away from the pressure sensor.

With the buffer disposed on a side of the pressure sensor facing away from the mainshaft, the buffer can buffer a force acting on the pressure sensor, preventing the pressure sensor from being damaged due to excessive pressure, thus ensuring work performance of the pressure sensor.

In a possible implementation, the stylus further includes a fixed bracket, where the fixed bracket is fixed in the barrel assembly and the fixed bracket includes a main body with an accommodating chamber, an opening of the accommodating chamber facing the mainshaft and the pressure sensor assembly being located in the accommodating chamber.

With the fixed bracket fixedly disposed in the barrel assembly and the pressure sensor assembly installed in the fixed bracket, the pressure sensor assembly is fixed in the barrel assembly.

In a possible implementation, the fixed bracket further includes a support plate, where the support plate is connected to a side of the main body facing away from the mainshaft, and an end of the control board is connected to the support plate.

In a possible implementation, the stylus further includes an insulating sleeve, where the insulating sleeve fits around the signal board, the second electrode fits around an outer wall of the insulating sleeve, and the insulating sleeve extends partly into the mainshaft and connects to the mainshaft.

A first through hole is provided in the insulating sleeve, a first conductive member fits around the signal board, and the second electrode extends partly into the first through hole and touches the first conductive member.

With the insulating sleeve fitting around the signal board, the second electrode fitting around the outer wall of the insulating sleeve, and the second electrode touching the first conductive member that fits around the signal board through the first through hole in the insulating sleeve, the second electrode and the signal board are electrically connected, the insulating sleeve can fix the second electrode, and interference between the second electrode and the signal board can be lessened by insulation and isolation provided by the insulating sleeve.

In a possible implementation, the stylus further includes a ground electrode, where the ground electrode fits around the outer wall of the insulating sleeve, and the ground electrode is located on a side of the second electrode closer to the first electrode.

A second through hole is provided in the insulating sleeve, a second conductive member fits around the signal board, and the ground electrode extends partly into the second through hole and touches the second conductive member.

With the ground electrode fitting around the insulating sleeve and touching the second conductive member that fits around the signal board through the second through hole in the insulating sleeve, the ground electrode and the signal board are electrically connected. In addition, being located between the first electrode and the second electrode, the ground electrode can lessen interference between the first electrode and the second electrode and improve accuracy of detection of a position and a tilt angle of the stylus by the electronic device.

In a possible implementation, the stylus further includes a fixed sleeve, where the fixed sleeve is fixed in the barrel assembly, the mainshaft extends into the fixed sleeve, a first limit part is provided on an outer wall of the mainshaft at an end facing towards the tip assembly, and the first limit part is configured to abut against an end of the fixed sleeve facing towards the tip assembly when the tip assembly is moving towards the barrel assembly.

With the fixed sleeve disposed in the barrel assembly and the mainshaft extending into the fixed sleeve, the mainshaft moves within the fixed sleeve; and with a guiding effect provided by an inner wall of the fixed sleeve on the movement of the mainshaft, displacement of the mainshaft in the process of moving can be avoided, thereby ensuring moving of the mainshaft along the axis of the barrel assembly and improving accuracy of force transfer by the mainshaft.

With the first limit part disposed at the end of the mainshaft facing towards the tip assembly, when the tip assembly is experiencing no pressure, a distance between the first limit part and the fixed sleeve can be less than the gap between the tip assembly and the barrel assembly. In this way, when the mainshaft moves to an extent that the first limit part abuts against the end of the fixed sleeve, there is still a gap present between the tip assembly and the barrel assembly, ensuring flexible movement of the tip assembly.

In a possible implementation, an elastic member fits around the outer wall of the mainshaft, a second limit part is provided on the outer wall of the mainshaft at an end facing away from the tip assembly, and the elastic member is clipped between an end of the fixed sleeve facing away from the tip assembly and the second limit part.

With the second limit part disposed on the outer wall of the mainshaft facing away from the tip assembly, the elastic member fitting around the outer wall of the mainshaft, and the elastic member clipped between the end of the fixed sleeve and the second limit part, the elastic member is in a pre-compressed state to ensure good contact between the mainshaft and the pressure sensor and to ensure accuracy of detection of the pressure on the tip assembly by the pressure sensor.

In a possible implementation, a limit bar is provided at an end of the fixed sleeve facing towards the fixed bracket, a limit recess is provided in a side wall of the main body of the fixed bracket, and the limit bar snaps into the limit recess.

With the limit bar disposed on the fixed sleeve, the limit recess disposed in the side wall of the fixed bracket to cooperate with the limit bar, and the limit bar snapping into the limit recess, relative rotation between the fixed sleeve and the fixed bracket can be prevented, so that the fixed sleeve and the fixed bracket are fixed firmly in the barrel assembly.

In a possible implementation, a first mounting hole is provided in a side wall of the mainshaft, a second mounting hole is provided in a side wall of the fixed sleeve, the second mounting hole communicates with the first mounting hole, and an end of the flexible electrical connection assembly extends into the mainshaft through the second mounting hole and the first mounting hole and connects to the signal board.

In a possible implementation, the flexible electrical connection assembly includes a flexible circuit board and an electrical connector, where the electrical connector is connected to an end of the flexible circuit board facing towards the control board and the bending part is located on the flexible circuit board.

The flexible circuit board extends along outer walls of the fixed bracket and the fixed sleeve, and the bending part passes through the second mounting hole and the first mounting hole, so that the end of the flexible circuit board to fit onto the signal board.

In a possible implementation, an end cover is provided to cover the second mounting hole of the fixed sleeve.

In a possible implementation, the stylus further includes a reinforcing member, where the reinforcing member covers part of surface areas on two sides of the signal board.

With the reinforcing member covering the surface areas on the two sides of the signal board, the reinforcing member can increase strength of the signal board, preventing the signal board from displacement or bending and ensuring performance of the signal board.

In a possible implementation, the first electrode is an emitter electrode and the second electrode includes a signal transmitting module and a signal receiving module.

With the signal transmitting module and the signal receiving module integrated in the second electrode, the second electrode can both send an excitation signal to the electronic device and receive a signal sent by the electronic device. In this way, there is no need to dispose another receiving electrode in the stylus, thus saving space in the stylus and facilitating assembling of the stylus.

Another aspect of this application provides an electronic device assembly, including an electronic device and the stylus according to any one of the foregoing implementations.

The electronic device assembly provided in this application includes a stylus, where a mainshaft and a pressure sensor assembly are disposed in the stylus, one end of the mainshaft is connected to a tip assembly, and the pressure sensor assembly is fixed in a barrel assembly and touching the other end of the mainshaft. The tip assembly moves under a pressure and drives the mainshaft to move, the mainshaft moves towards the barrel assembly and transfers the pressure on the tip assembly to the pressure sensor assembly, and the pressure sensor assembly detects the pressure on the tip assembly. In this way, a transfer manner of the pressure on the tip assembly is simplified so that fewer components are disposed in the stylus, simplifying manufacturing and assembling processes of the stylus and reducing costs of the stylus. In addition, this can improve the accuracy of detection of the pressure on the tip assembly, thereby improving writing resolution of the tip assembly.

With a signal board extending into the tip assembly and connecting to a first electrode located at a writing end of the tip assembly, a size of the first electrode is reduced, a distance between the first electrode and a touchscreen is shortened, and accuracy of positioning of the tip assembly of the stylus by the electronic device is improved. In addition, with a second electrode fitting around the signal board, the moving of the tip assembly can drive the first electrode and the second electrode to move synchronously, so that relative positions of the second electrode and the first electrode remain unchanged, improving measurement accuracy of a tilt angle of the stylus relative to the touchscreen by the electronic device.

With two ends of a flexible electrical connection assembly connected to the signal board and a control board respectively, signals can be transmitted between the signal board and the control board. In addition, with a bending part disposed between the two ends of the flexible electrical connection assembly, the bending part enables the flexible electrical connection assembly to have some extension allowance, preventing the flexible electrical connection assembly from being torn or damaged due to pulling when the tip assembly moves away from the barrel assembly, thereby ensuring long-term service performance of the flexible electrical connection assembly.

In a possible implementation, the electronic device assembly further includes a wireless keyboard, where the wireless keyboard has an accommodating portion for accommodating the stylus.

Reference signs are described as follows:
100: stylus; 200: electronic device; 201: touchscreen; 300: wireless keyboard; 301: first part; 301a: first bracket; 301b: second bracket; 302: second part; 303: accommodating portion; 304: connecting portion;
110: processor; 120: pressure sensor; 130: inertial sensor; 140: status indicator; 150: button; 160: electrode; 170: sensing circuit; 180: bluetooth module; 190: charging module;
210: processor; 220: input surface; 230: coordination engine; 240: power subsystem; 250: power connector; 260: wireless interface; 270: display;
310: processor; 320: memory; 330: charging interface; 340: charging management module; 350: wireless charging coil; 360: battery; 370: wireless communications module; 380: touch panel; 390: keyboard;

10: tip assembly; 10a: gap; 11: writing end; 12: connecting end; 20: barrel assembly; 30: back cover; 41: first emitter electrode; 42: second emitter electrode; 43: ground electrode; 44: first electrode; 45: second electrode; 50: mainshaft assembly; 51: external thread; 60: pressure sensitive assembly; 70: circuit board; 80: battery assembly; 90: pressure sensor assembly;

21: fixed bracket; 22: insulating sleeve; 23: fixed sleeve; 52: mainshaft; 71: signal board; 72: flexible electrical connection assembly; 91: pressure sensor; 92: electrical connecting member; 93: buffer;

211: main body; 212: support plate; 221: first through hole; 222: second through hole; 231: limit bar; 232: second mounting hole; 233: end cover; 521: first limit part; 522: second limit part; 523: elastic member; 524: first mounting hole; 711: first conductive member; 712: second conductive member; 713: reinforcing member; 721: flexible circuit board; 722: electrical connector; 921: pin; and 2111: accommodating chamber; 2112: limit recess; 2113: positioning hole; 2114: mounting recess; 7211: bending part.

DESCRIPTION OF EMBODIMENTS

Terms in the embodiments of this application are merely intended to describe specific embodiments of this application, and are not intended to limit this application.

Figure 1:
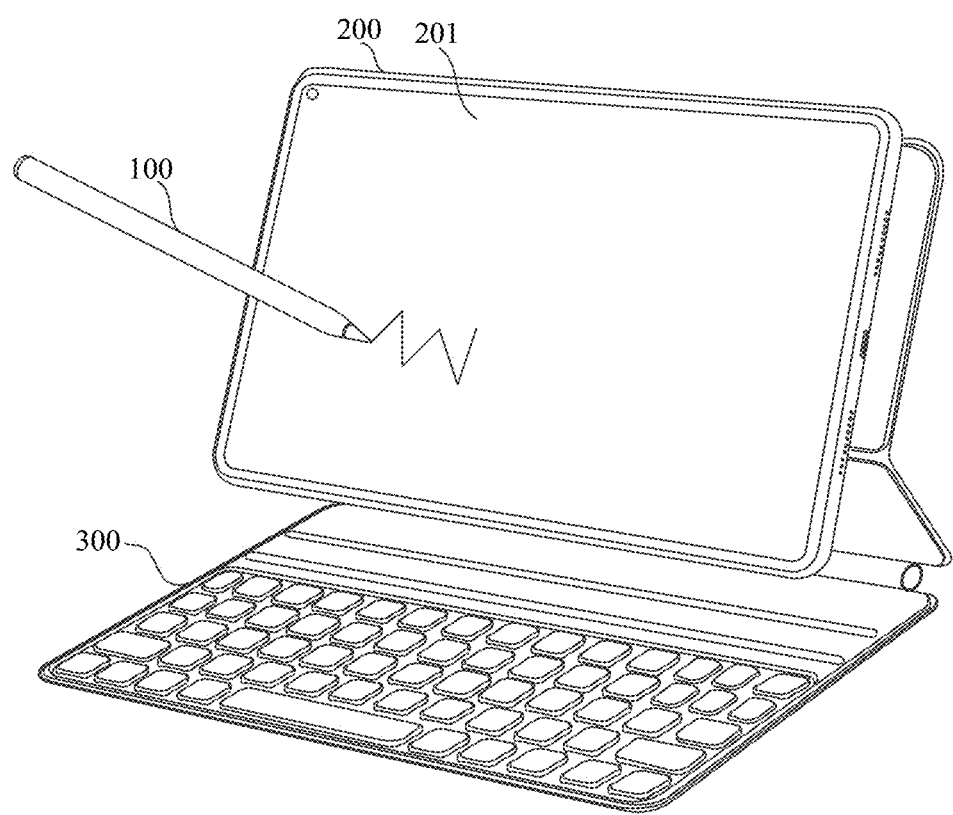
FIG. 1 is a schematic diagram of a scenario to which an embodiment of this application is applicable.

FIG. 1 is a schematic diagram of a scenario to which an embodiment of this application is applicable. Referring to FIG. 1, the scenario includes a stylus (stylus) 100, an electronic device 200, and a wireless keyboard 300. In FIG. 1, a tablet (tablet) is used as an example of the electronic device 200 for description. The stylus 100 and the wireless keyboard 300 may provide input to the electronic device 200, and the electronic device 200 performs, based on the input of the stylus 100 or the wireless keyboard 300, an operation in response to the input. A touch area may be set on the wireless keyboard 300, the stylus 100 may operate the touch area of the wireless keyboard 300 to provide input to the wireless keyboard 300, and the wireless keyboard 300 may perform, based on the input of the stylus 100, an operation in response to the input. In an embodiment, the stylus 100 and the electronic device 200, the stylus 100 and the wireless keyboard 300, and the electronic device 200 and the wireless keyboard 300 may be interconnected through a communications network to implement wireless signal interaction. The communications network may be, but is not limited to, a Wi-Fi hotspot network, a Wi-Fi peer-to-peer (peer-to-peer, P2P) network, a bluetooth network, a zigbee network, a near field communication (near field communication, NFC) network, or other short-range communications networks.

The stylus 100 may be, but is not limited to, an inductive stylus or a capacitive stylus. The electronic device 200 has a touchscreen 201. When the stylus 100 is an inductive stylus, an electromagnetic induction board needs to be integrated in the touchscreen 201 of the electronic device 200 that interacts with the stylus 100. Coils are distributed on the electromagnetic induction board, and coils are also integrated in the inductive stylus. Based on the principle of electromagnetic induction, within a range of a magnetic field generated by the electromagnetic induction board, the inductive stylus can accumulate electrical energy with movement of the inductive stylus. The inductive stylus may transmit the accumulated electric energy to the electromagnetic induction board via the coils in the inductive stylus through free oscillation. The electromagnetic induction board may scan the coils on the electromagnetic induction board based on the electric energy from the inductive stylus to calculate a position of the inductive stylus on the touchscreen 201. The touchscreen 201 in the electronic device 200 may also be referred to as a touch panel.

The capacitive stylus may include a passive capacitive stylus and an active capacitive stylus.

One or more electrodes may be set in the active capacitive stylus (for example, in the tip assembly of the stylus), and the active capacitive stylus may transmit a signal through the electrode(s). When the stylus 100 is an active capacitive stylus, an electrode array needs to be integrated in the touchscreen 201 of the electronic device 200 that interacts with the stylus 100. In an embodiment, the electrode array may be a capacitive electrode array. The electronic device 200 may receive a signal from the active capacitive stylus through the electrode array; and when receiving the signal, the electronic device 200 further recognizes a position of the active capacitive stylus on the touchscreen and a tilt angle of the active capacitive stylus based on changing of a capacitance value on the touchscreen 201.

Figure 2A:
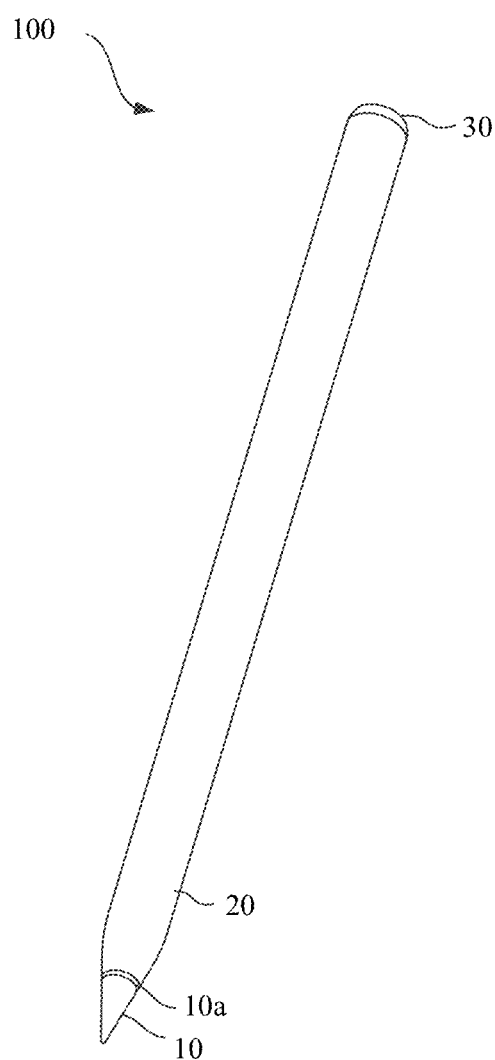
FIG. 2A is a schematic structural diagram of a stylus according to an embodiment of this application.

FIG. 2A is a schematic structural diagram of a stylus according to an embodiment of this application. Referring to FIG. 2A, the stylus 100 may include a tip assembly 10, a barrel assembly 20, and a back cover 30. The barrel assembly 20 is hollowed inside, the tip assembly 10 and the back cover 30 are located at two ends of the barrel assembly 20 respectively, and the back cover 30 and the barrel assembly 20 may be plugged or buckled. For a matching relationship between the tip assembly 10 and the barrel assembly 20, refer to the descriptions in FIG. 2B.

Figure 2B:
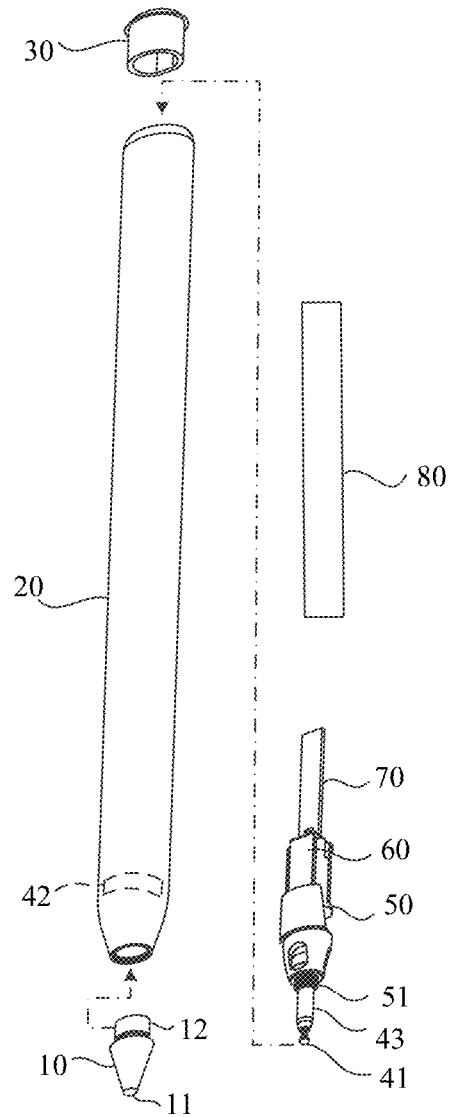
FIG. 2B is a schematic diagram of a partially disassembled structure of a stylus according to an embodiment of this application.

FIG. 2B is a schematic diagram of a partially disassembled structure of a stylus according to an embodiment of this application. Referring to FIG. 2B, the stylus 100 further includes a mainshaft assembly 50, the mainshaft assembly 50 is located in the barrel assembly 20, and the mainshaft assembly 50 is slidably disposed in the barrel assembly 20. The mainshaft assembly 50 has an external thread 51, and the tip assembly 10 includes a writing end 11 and a connecting end 12, where the connecting end 12 of the tip assembly 10 has an internal thread (not shown) matching the external thread 51.

When the mainshaft assembly 50 is assembled into the barrel assembly 20, the connecting end 12 of the tip assembly 10 extends into the barrel assembly 20 and is threadedly connected to the external thread 51 of the mainshaft assembly 50. In some other examples, the connecting end 12 of the tip assembly 10 may alternatively be detachably connected to the mainshaft assembly 50 through buckling or the like. With the connecting end 12 of the tip assembly 10 detachably connected to the mainshaft assembly 50, the tip assembly 10 is replaceable.

For detection of pressure on the writing end 11 of the tip assembly 10, as shown in FIG. 2A, a gap 10a is left between the tip assembly 10 and the barrel assembly 20, which can ensure that when the writing end 11 of the tip assembly 10 is experiencing an external force, the tip assembly 10 can move toward the barrel assembly 20, and the movement of the tip assembly 10 drives the mainshaft assembly 50 to move within the barrel assembly 20. For detection of an external force, as shown in FIG. 2B, the mainshaft assembly 50 is provided with a pressure sensitive assembly 60, where the pressure sensitive assembly 60 is partly fixedly connected to a fixed structure in the barrel assembly 20 and partly fixedly connected to the mainshaft assembly 50. In this way, when the mainshaft assembly 50 moves with the tip assembly 10, because part of the pressure sensitive assembly 60 is fixedly connected to the fixed structure in the barrel assembly 20, the movement of the mainshaft assembly 50 causes the pressure sensitive assembly 60 to deform, and the deformation of the pressure sensitive assembly 60 is transferred to a circuit board 70 (for example, the pressure sensitive assembly 60 and the circuit board 70 may be electrically connected through a wire or a flexible circuit board), the circuit board 70 detects the pressure on the writing end 11 of the tip assembly 10 based on the deformation of the pressure sensitive assembly 60, and accordingly controls line thickness of the writing end 11 based on the pressure on the writing end 11 of the tip assembly 10.

It should be noted that the detection of pressure on the tip assembly 10 includes but is not limited to the foregoing method. For example, a pressure sensor may be provided in the writing end 11 of the tip assembly 10, and the pressure on the tip assembly 10 is detected by the pressure sensor.

In this embodiment, as shown in FIG. 2B, the stylus 100 further includes a plurality of electrodes, and the plurality of electrodes may be, for example, a first emitter electrode 41, a ground electrode 43, and a second emitter electrode 42. The first emitter electrode 41, the ground electrode 43, and the second emitter electrode 42 are all electrically connected to the circuit board 70. The first emitter electrode 41 may be located within the tip assembly 10 and close to the writing end 11, and the circuit board 70 may be configured as a control board capable of providing separate signals to the first emitter electrode 41 and the second emitter electrode 42. The first emitter electrode 41 is configured to emit a first signal, and when the first emitter electrode 41 is close to the touchscreen 201 of the electronic device 200, a coupling capacitance can be produced between the first emitter electrode 41 and the touchscreen 201 of the electronic device 200, so that the electronic device 200 can receive the first signal. The second emitter electrode 42 is configured to emit a second signal, and the electronic device 200 may determine a tilt angle of the stylus 100 based on the second signal received. In an embodiment of this application, the second emitter electrode 42 may be located on an inner wall of the barrel assembly 20. In an example, the second emitter electrode 42 may alternatively be located on the mainshaft assembly 50.

The ground electrode 43 may be located between the first emitter electrode 41 and the second emitter electrode 42, or the ground electrode 43 may be located around an outer periphery of the first emitter electrode 41 and the second emitter electrode 42, and the ground electrode 43 is configured to reduce coupling between the first emitter electrode 41 and the second emitter electrode 42.

When the electronic device 200 receives the first signal from the stylus 100, a capacitance value at a corresponding position of the touchscreen 201 changes. Accordingly, the electronic device 200 may determine the position of the stylus 100 (or the tip assembly of the stylus 100) on the touchscreen 201 based on the changing of the capacitance value on the touchscreen 201. In addition, the electronic device 200 may obtain the tilt angle of the stylus 100 by using a double-tip projection method in tilt angle detection algorithms. Positions of the first emitter electrode 41 and the second emitter electrode 42 in the stylus 100 are different. Therefore, when the electronic device 200 receives the first signal and the second signal from the stylus 100, capacitance values at two positions on the touchscreen 201 will change. The electronic device 200 may obtain the tilt angle of the stylus 100 based on a distance between the first emitter electrode 41 and the second emitter electrode 42 and a distance between the two positions on the touchscreen 201 at which the capacitance values change. For more details about how the tilt angle of the stylus 100 is obtained, reference may be made to relevant descriptions of the double-tip projection method in the prior art.

In an embodiment of this application, as shown in FIG. 2B, the stylus 100 further includes a battery assembly 80, where the battery assembly 80 is configured to provide power to the circuit board 70. The battery assembly 80 may include a lithium-ion battery, or the battery assembly 80 may include a nickel-chromium battery, an alkaline battery, a nickel-metal hydride battery, or the like. In an embodiment, the battery included in the battery assembly 80 may be a rechargeable battery or a disposable battery. When the battery included in the battery assembly 80 is a rechargeable battery, the stylus 100 supports wireless charging for the battery in the battery assembly 80.

Figure 3:
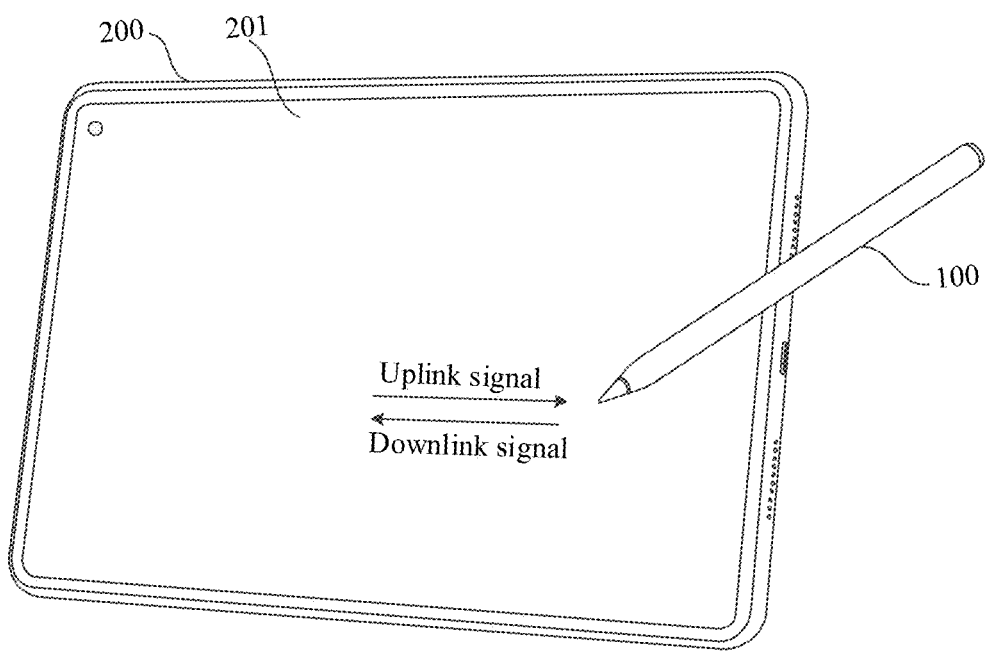
FIG. 3 is a schematic diagram of interaction between a stylus and an electronic device according to an embodiment of this application.

FIG. 3 is a schematic diagram of interaction between a stylus and an electronic device according to an embodiment of this application. As shown in FIG. 3, when the stylus 100 is an active capacitive stylus, after the electronic device 200 and the stylus 100 are wirelessly connected, the electronic device 200 may send an uplink signal to the stylus 100 through the electrode array integrated in the touchscreen 201. The stylus 100 may receive the uplink signal through a receiving electrode, and the stylus 100 may transmit a downlink signal through an emitter electrode (for example, the first emitter electrode 41 or the second emitter electrode 42). The downlink signal includes the foregoing first signal and second signal. When the tip assembly 10 of the stylus 100 contacts the touchscreen 201, a capacitance value at a corresponding position of the touchscreen 201 changes, and the electronic device 200 may determine a position of the tip assembly 10 of the stylus 100 on the touchscreen 201 based on the capacitance value on the touchscreen 201. In an embodiment, the uplink signal and the downlink signal may be square wave signals.

Figure 4:
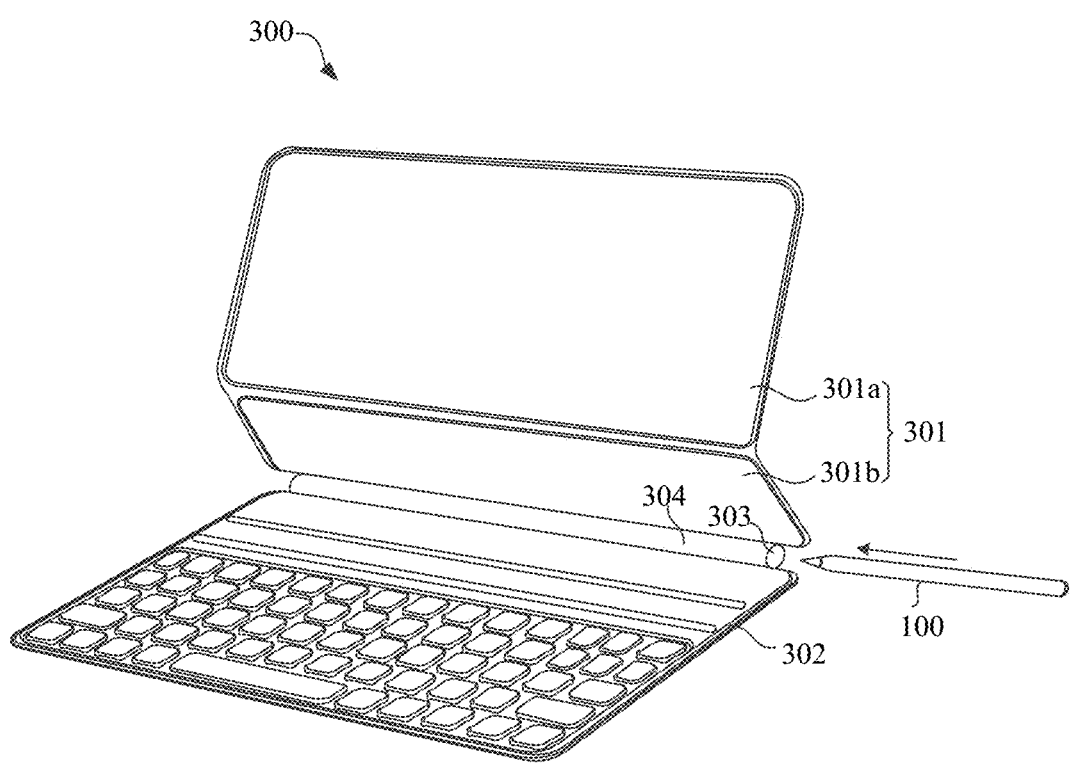
FIG. 4 is a schematic diagram of assembling of a stylus and a wireless keyboard according to an embodiment of this application.

FIG. 4 is a schematic diagram of assembling of a stylus and a wireless keyboard according to an embodiment of this application. Referring to FIG. 4, in an embodiment, the wireless keyboard 300 may include a first part 301 and a second part 302. For example, the wireless keyboard 300 may include a keyboard body and a keyboard cover. The first part 301 may be the keyboard cover, and the second part 302 may be the keyboard body. The first part 301 is configured to hold the electronic device 200, and the second part 302 may be provided with keys, a touch panel, and the like for user operation.

When the wireless keyboard 300 is in use, the first part 301 and the second part 302 of the wireless keyboard 300 need to be opened, and when the wireless keyboard 300 is not in use, the first part 301 and the second part 302 of the wireless keyboard 300 can be closed. In an embodiment, the first part 301 and the second part 302 of the wireless keyboard 300 may be rotatably connected. For example, the first part 301 and the second part 302 may be connected through a rotating shaft or a hinge, or in some examples, the first part 301 and the second part 302 are rotatably connected through a flexible material (for example, a leather material or a cloth material). Alternatively, in some examples, the first part 301 and the second part 302 may be integrally formed, and a joint between the first part 301 and the second part 302 is thinned so that the joint between the first part 301 and the second part 302 can be bent. The first part 301 and the second part 302 may be connected by using the foregoing rotatable connection manners without limitation.

The first part 301 may include at least two brackets that are rotatably connected. For example, referring to FIG. 4, the first part 301 includes a first bracket 301a and a second bracket 301b. The first bracket 301a and the second bracket 301b are rotatably connected. During use of the electronic device 200, the first bracket 301a and the second bracket 301b may be used together to jointly support the electronic device 200 (refer to FIG. 1). Alternatively, the first bracket 301a supports the second bracket 301b, and the second bracket 301b supports the electronic device 200. Referring to FIG. 4, the second bracket 301b and the second part 302 are rotatably connected.

Referring to FIG. 4, to accommodate the stylus 100, the wireless keyboard 300 may be provided with an accommodating portion 303 for accommodating the stylus 100. Referring to FIG. 4, the accommodating portion 303 is a cylindrical chamber. To be accommodated, the stylus 100 is inserted into the accommodating chamber in a direction of the arrow in FIG. 4. In this embodiment, referring to FIG. 4, the second part 302 and the second bracket 301b are rotatably connected by using a connecting portion 304, and the connecting portion 304 is provided with the accommodating portion 303. The connecting portion 304 may be a rotating shaft, within which a chamber may be provided to form the accommodating portion 303.

Certainly, in some examples, the accommodating portion 303 may alternatively be provided on a surface of the connecting portion 304, or the accommodating portion 303 may alternatively be provided close to the connecting portion 304.

Figure 5A:
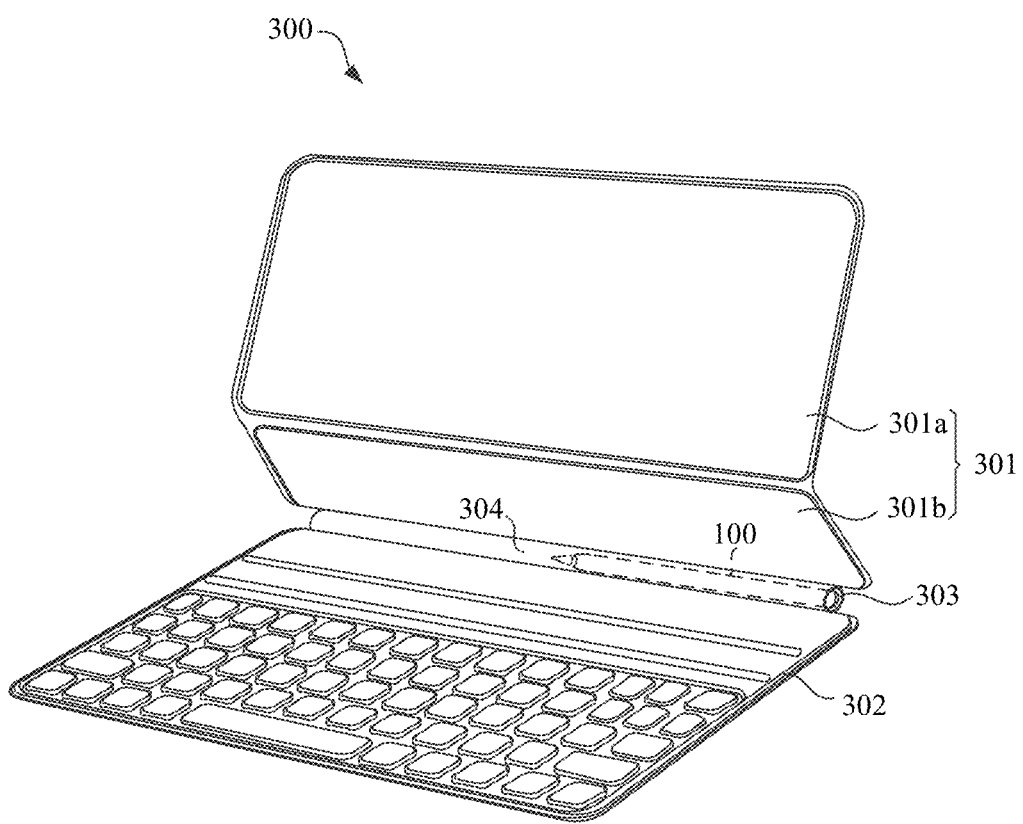
FIG. 5A is a schematic diagram of a stylus being accommodated in an accommodating portion of a wireless keyboard according to an embodiment of this application.
Figure 5B:
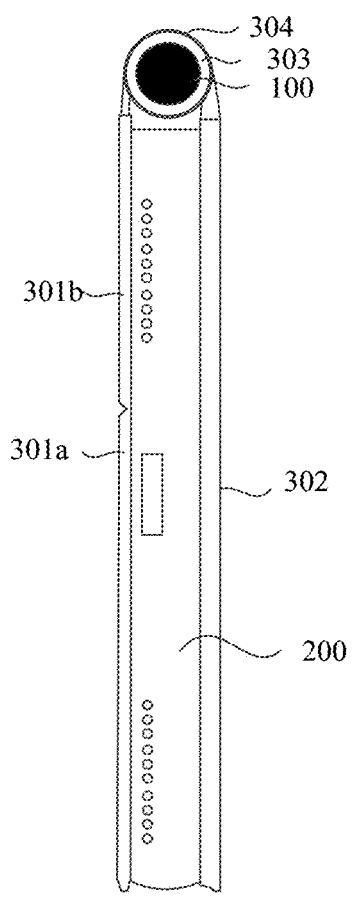
FIG. 5B is a schematic side view of a stylus being accommodated in an accommodating portion of a wireless keyboard according to an embodiment of this application.

FIG. 5A is a schematic diagram of a stylus being accommodated in an accommodating portion of a wireless keyboard according to an embodiment of this application; and FIG. 5B is a schematic side view of a stylus being accommodated in an accommodating portion of a wireless keyboard according to an embodiment of this application. Referring to FIG. 5B, the accommodating portion 303 is a cylindrical chamber, and an inner diameter of the accommodating portion 303 is larger than an outer diameter of the stylus 100.

To prevent the stylus 100 from dropping from the accommodating portion 303, in an embodiment, a magnetic material may be provided in an inner wall of the accommodating portion 303, and a magnetic material may be provided in the stylus 100. The stylus 100 is adsorbed in the accommodating portion 303 by magnetic adsorption between the magnetic materials. Certainly, in some examples, the stylus 100 may be fastened to the accommodating portion 303 by means including but not limited to magnetic adsorption. For example, the stylus 100 may alternatively be fastened to the accommodating portion 303 by buckling.

For ease of taking the stylus 100 out of the accommodating portion 303, an eject mechanism may be provided in the accommodating portion 303. For example, when one end of the stylus 100 is pressed, the eject mechanism may drive one end of the stylus 100 to eject from the accommodating portion 303.

Figure 6:
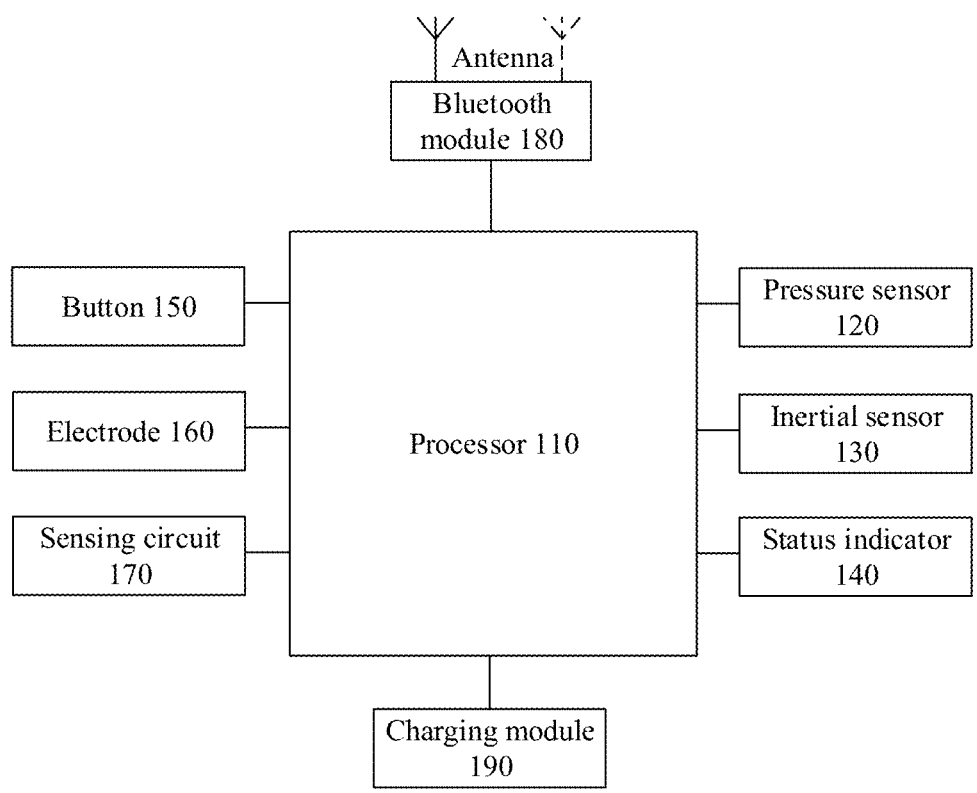
FIG. 6 is a schematic diagram of a hardware structure of a stylus according to an embodiment of this application.

FIG. 6 is a schematic diagram of a hardware structure of a stylus according to an embodiment of this application. Referring to FIG. 6, the stylus 100 may include a processor 110. The processor 110 may include a storage and a processing circuit for supporting operations of the stylus 100. The storage may include a storage device such as a non-volatile memory (for example, a flash memory or another electrically programmable read-only memory configured as a solid state drive), a volatile memory (for example, a static or dynamic random access memory), or the like. The processing circuit in the processor 110 may be configured to control operations of the stylus 100. The processing circuit may be based on one or more microprocessors, microcontrollers, digital signal processors, baseband processors, power management units, audio chips, application specific integrated circuits, and the like.

The stylus 100 may include one or more sensors. For example, the sensor(s) may include a pressure sensor 120. The pressure sensor 120 may be disposed at the writing end 11 of the stylus 100 (as shown in FIG. 2B). Certainly, the pressure sensor 120 may alternatively be disposed in the barrel assembly 20 of the stylus 100, so that after one end of the tip assembly 10 of the stylus 100 is experiencing a force, the other end of the tip assembly 10 moves to make the force act on the pressure sensor 120. In an embodiment, the processor 110 may adjust, based on the pressure detected by the pressure sensor 120, the thickness of lines written using the tip assembly 10 of the stylus 100.

The sensors may further include an inertial sensor 130. The inertial sensor 130 may include a three-axis accelerometer and a three-axis gyroscope, and/or other components for measuring motion of the stylus 100. For example, a three-axis magnetometer may be included in the sensor as a nine-axis inertial sensor structure. The sensors may further include additional sensors, such as a temperature sensor, an ambient light sensor, a light-based proximity sensor, a contact sensor, a magnetic sensor, a pressure sensor, and/or other sensors.

The stylus 100 may include a status indicator 140 such as a light emitting diode and a button 150. The status indicator 140 is configured to alert a user of a status of the stylus 100. The button 150 may include a mechanical button and a non-mechanical button, and the button 150 may be configured to collect press-button information from a user.

In an embodiment of this application, the stylus 100 may include one or more electrodes 160 (for details, refer to the descriptions of FIG. 2B). One of the electrodes 160 may be located at the writing end of the stylus 100, and one of the electrodes 160 may be located inside the tip assembly 10. Reference may be made to the foregoing relevant descriptions.

The stylus 100 may include a sensing circuit 170. The sensing circuit 170 may sense capacitive coupling between the electrodes 160 and drive lines of a capacitive touch sensor panel that interacts with the stylus 100. The sensing circuit 170 may include an amplifier for receiving a capacitance reading from the capacitive touch sensor panel, a clock for generating a demodulation signal, a phase shifter for generating a phase shifted demodulation signal, a mixer for demodulating a capacitance reading by using an in-phase demodulation frequency component, and a mixer for demodulating a capacitance reading by using a quadrature demodulation frequency component. Results of demodulation by the mixers may be used for determining an amplitude proportional to a capacitance, so that the stylus 100 can sense contact with the capacitive touch sensor panel.

It can be understood that, according to an actual need, the stylus 100 may include a microphone, a speaker, an audio generator, a vibrator, a camera, a data port, and other devices. A user may use these devices to provide commands to control operations of the stylus 100 and the electronic device 200 that interacts with the stylus 100, and receive status information and other output.

The processor 110 may be configured to run software on the stylus 100 for controlling operations of the stylus 100. During operations of the stylus 100, the software running on the processor 110 may process sensor inputs, button inputs, and inputs from other devices to monitor movement of the stylus 100 and other user inputs. The software running on the processor 110 may detect user commands and may communicate with the electronic device 200.

To support wireless communication between the stylus 100 and the electronic device 200, the stylus 100 may include a wireless module. In FIG. 6, a bluetooth module 180 is used as an example of the wireless module for description. The wireless module may alternatively be a Wi-Fi hotspot module, a Wi-Fi peer-to-peer module, or the like. The bluetooth module 180 may include a radio frequency transceiver, for example, a transceiver. The bluetooth module 180 may further include one or more antennas. The transceiver may transmit and/or receive a wireless signal by using the antenna(s). Depending on type of the wireless module, the wireless signal may be a bluetooth signal, a wireless local area network signal, a remote signal such as a cellular telephone signal, a near field communication signal, or other wireless signals.

The stylus 100 may further include a charging module 190, and the charging module 190 may support charging of the stylus 100 and provide power for the stylus 100.

It should be understood that the electronic device 200 in the embodiments of this application may be user equipment (user equipment, UE), a terminal (terminal), or the like. For example, the electronic device 200 may be a portable android device (portable android device, PAD), a personal digital assistant (personal digital assistant, PDA), a handheld device, computing device, vehicle-mounted device, or wearable device with a wireless communication function, or a mobile terminal or fixed terminal with a touchscreen such as a virtual reality (virtual reality, VR) terminal device, an augmented reality (augmented reality, AR) terminal device, a wireless terminal in industrial control (industrial control), a wireless terminal in self driving (self driving), a wireless terminal in remote medical (remote medical), a wireless terminal in smart grid (smart grid), a wireless terminal in transportation safety (transportation safety), a wireless terminal in smart city (smart city), or a wireless terminal in smart home (smart home). The form of the terminal device is not specifically limited in the embodiments of this application.

Figure 7:
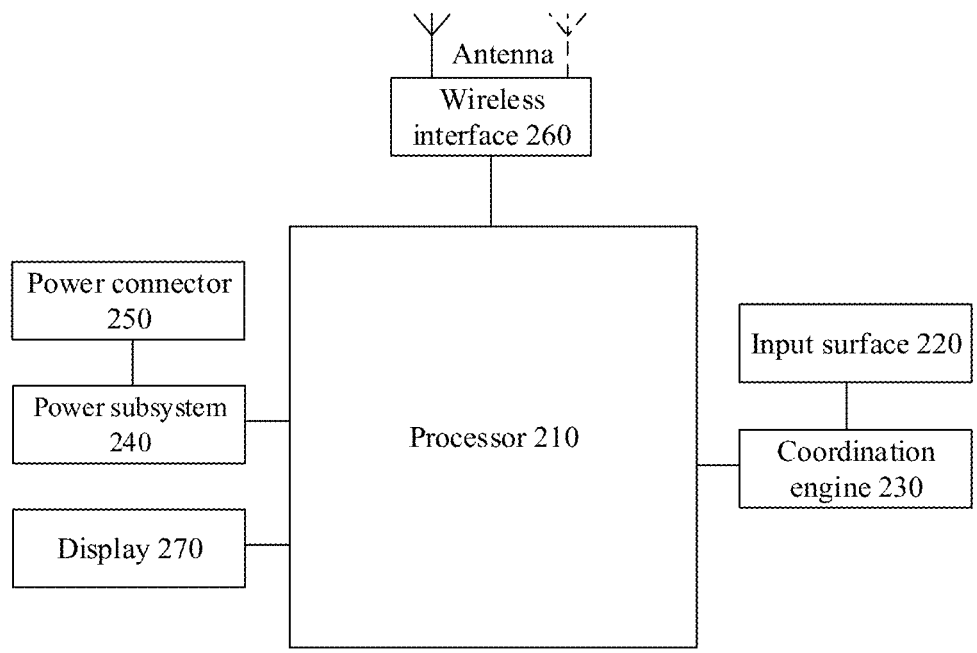
FIG. 7 is a schematic diagram of a hardware structure of an electronic device according to an embodiment of this application.

FIG. 7 is a schematic diagram of a hardware structure of an electronic device according to an embodiment of this application. Referring to FIG. 7, the electronic device 200 may include a plurality of subsystems. These subsystems cooperate to perform, coordinate, or monitor one or more operations or functions of the electronic device 200. The electronic device 200 includes a processor 210, an input surface 220, a coordination engine 230, a power subsystem 240, a power connector 250, a wireless interface 260, and a display 270.

For example, the coordination engine 230 may be configured to: communicate with other subsystems of the electronic device 200 and/or process data; communicate with and/or exchange data with the stylus 100; measure and/or obtain output of one or more analog or digital sensors (for example, a touch sensor); measure and/or obtain output of one or more sensor nodes in a sensor node array (for example, a capacitive sensing node array); receive and locate a tip signal and a ring signal from the stylus 100; locate the stylus 100 based on intersection area positions of the tip signal and the ring signal; and so on.

The coordination engine 230 of the electronic device 200 includes or is otherwise communicatively coupled to a sensor layer located under the input surface 220 or integrated with the input surface. The coordination engine 230 locates the stylus 100 on the input surface 220 by using the sensor layer, and estimates an angular position of the stylus 100 relative to a plane on which the input surface 220 lies, by using the technique described herein. In an embodiment, the input surface 220 may be referred to as a touchscreen 201.

For example, the sensor layer of the coordination engine 230 of the electronic device 200 is a grid of capacitive sensing nodes arranged in columns and rows. More specifically, an array of column traces is arranged perpendicular to an array of row traces. The sensor layer may be separated from other layers of the electronic device, or the sensor layer may be disposed directly on another layer. The other layers are, for example without limitation, a display stack layer, a force sensor layer, a digitizer layer, a polarizer layer, a battery layer, a structural or decorative shell layer, and the like.

The sensor layer can operate in various modes. If the sensor layer operates in a mutual capacitance mode, the column traces and the row traces form one capacitive sensing node at each overlapping point (for example, a "vertical" mutual capacitance). If the sensor layer operates in a self-capacitance mode, the column traces and the row traces form two (vertically aligned) capacitive sensing nodes at each overlapping point. In another embodiment, if the sensor layer operates in a mutual capacitance mode, adjacent column traces and/or adjacent row traces may each form one capacitive sensing node (for example, in the case of "horizontal" mutual capacitance). As described above, the sensor layer may detect presence of the tip assembly 10 of the stylus 100 and/or touch by a user's finger by monitoring changing of capacitance (for example, mutual capacitance or self-capacitance) presented at each capacitive sensing node. In many cases, the coordination engine 230 may be configured to detect, through capacitive coupling, tip and ring signals received from the stylus 100 via the sensor layer.

The tip signal and/or the ring signal may include specific information and/or data that may be configured to cause the electronic device 200 to recognize the stylus 100. Such information is generally referred to as "stylus identity" information herein. Such information and/or data may be received by the sensor layer, and interpreted, decoded, and/or demodulated by the coordination engine 230.

The processor 210 may use the stylus identity information to simultaneously receive input from more than one stylus. Specifically, the coordination engine 230 may be configured to transmit a position and/or an angular position of each of the styluses detected by the coordination engine 230 to the processor 210. In other cases, the coordination engine 230 may also transmit information about relative positions and/or relative angular positions of the plurality of styluses detected by the coordination engine 230 to the processor 210. For example, the coordination engine 230 may notify the processor 210 of a position of a detected first stylus relative to a detected second stylus.

In other cases, the tip signal and/or the ring signal may further include specific information and/or data for enabling the electronic device 200 to identify a specific user. Such information is generally referred to as "user identity" information herein.

The coordination engine 230 may forward the user identity information (if detected and/or recovered) to the processor 210. If the user identity information cannot be recovered from the tip signal and/or the ring signal, the coordination engine 230 may optionally indicate to the processor 210 that user identity information is unavailable. The processor 210 can utilize the user identity information (or absence of such information) in any suitable manner, including but not limited to: accepting or denying input from the specific user, allowing or denying access to a specific function of the electronic device, and the like. The processor 210 may use the user identity information to simultaneously receive input from more than one user.

In still other cases, the tip signal and/or ring signal may include specific information and/or data that may be configured to cause the electronic device 200 to identify a setting or preference of the user or the stylus 100. Such information is generally referred to as "stylus settings" information herein.

The coordination engine 230 may forward the stylus settings information (if detected and/or recovered) to the processor 210. If the stylus settings information cannot be recovered from the tip signal and/or the ring signal, the coordination engine 230 may optionally indicate to the processor 210 that the stylus settings information is unavailable. The electronic device 200 can utilize the stylus settings information (or absence of such information) in any suitable manner, including but not limited to: applying a setting to the electronic device, applying a setting to a program running on the electronic device, changing a line thickness, a color, a pattern presented by a graphics program of the electronic device, changing a setting of a video game operated on the electronic device, and the like.

In general, the processor 210 may be configured to perform, coordinate, and/or manage functions of the electronic device 200. Such functions may include, but are not limited to, communicating with and/or exchanging data with other subsystems of the electronic device 200; communicating with and/or exchanging data with the stylus 100; performing data communication and/or data exchange over a wireless interface; performing data communication and/or data exchange over a wired interface; facilitating exchange of power through a wireless (for example, inductive or resonant) or wired interface; receiving position(s) and angular position(s) of one or more styluses; and so on.

The processor 210 may be implemented as any electronic device capable of processing, receiving, or transmitting data or instructions. For example, the processor may be a microprocessor, a central processing unit, an application specific integrated circuit, a field programmable gate array, a digital signal processor, an analog circuit, a digital circuit, or a combination of these devices. The processor may be a single-threaded or multi-threaded processor. The processor may be a single-core or multi-core processor.

During use, the processor 210 may be configured to access a memory in which instructions are stored. The instructions may be configured to cause the processor to perform, coordinate, or monitor one or more operations or functions of the electronic device 200.

The instructions stored in the memory may be configured to control or coordinate operations of other components of the electronic device 200. The components are, for example without limitation, another processor, an analog or digital circuit, a volatile or nonvolatile memory module, a display, a speaker, a microphone, a rotary input device, a button, or other physical input devices, a biometric authentication sensor and/or system, a force or touch input/output component, a communications module (for example, a wireless interface and/or a power connector), and/or a haptic or haptic feedback device.

The memory may further store electronic data for use by the stylus or the processor. For example, the memory may store electronic data or content (for example, media files, documents, and application programs), device settings and preferences, timing signals and control signals, or data, data structures, or databases for various modules, and files or configurations related to detection of tip signals and/or ring signals. The memory may be configured as any type of memory. For example, the memory may be implemented as a random access memory, a read only memory, a flash memory, a removable memory, other types of storage elements, or a combination of such devices.

The electronic device 200 further includes the power subsystem 240. The power subsystem 240 may include a battery or other power sources. The power subsystem 240 may be configured to provide power to the electronic device 200. The power subsystem 240 may also be coupled to the power connector 250. The power connector 250 may be any suitable connector or port, and may be configured to receive power from an external power source and/or configured to provide power to an external load. For example, in some embodiments, the power connector 250 may be configured to recharge the battery in the power subsystem 240. In another embodiment, the power connector 250 may be configured to transfer power stored in (or available to) the power subsystem 240 to the stylus 100.

The electronic device 200 further includes the wireless interface 260 to facilitate electronic communication between the electronic device 200 and the stylus 100. In an embodiment, the electronic device 200 may be configured to communicate with the stylus 100 via a low-energy bluetooth communications interface or a near field communications interface. In other examples, the communications interface helps implement electronic communication between the electronic device 200 and an external communications network, device, or platform.

The wireless interface 260 (whether the communications interface between the electronic device 200 and the stylus 100 or another communications interface) may be implemented as one or more wireless interfaces, bluetooth interfaces, near field communications interfaces, magnetic interfaces, universal serial bus interfaces, inductive interfaces, resonant interfaces, capacitive coupling interfaces, Wi-Fi interfaces, TCP/IP interfaces, network communications interfaces, optical interfaces, acoustic interfaces, or any traditional communications interfaces.

The electronic device 200 further includes the display 270. The display 270 may be located behind the input surface 220, or may be integrated therewith. The display 270 may be communicatively coupled to the processor 210. The processor 210 may use the display 270 to present information to a user. In many cases, the processor 210 uses the display 270 to present an interface with which the user can interact. In many cases, the user manipulates the stylus 100 to interact with the interface.

It will be apparent to those skilled in the art that some of the specific details presented above with respect to the electronic device 200 may not be required to practice particular embodiments or their equivalents. Similarly, other electronic devices may include more subsystems, modules, components, and the like. Some sub-modules may be implemented as software or hardware, where appropriate. Therefore, it should be understood that the foregoing descriptions are not intended to be exhaustive or to limit the disclosure to the precise form set forth herein. On the contrary, it will be obvious to those of ordinary skill in the art that many modifications and variations are possible in light of the foregoing teachings.

Figure 8:
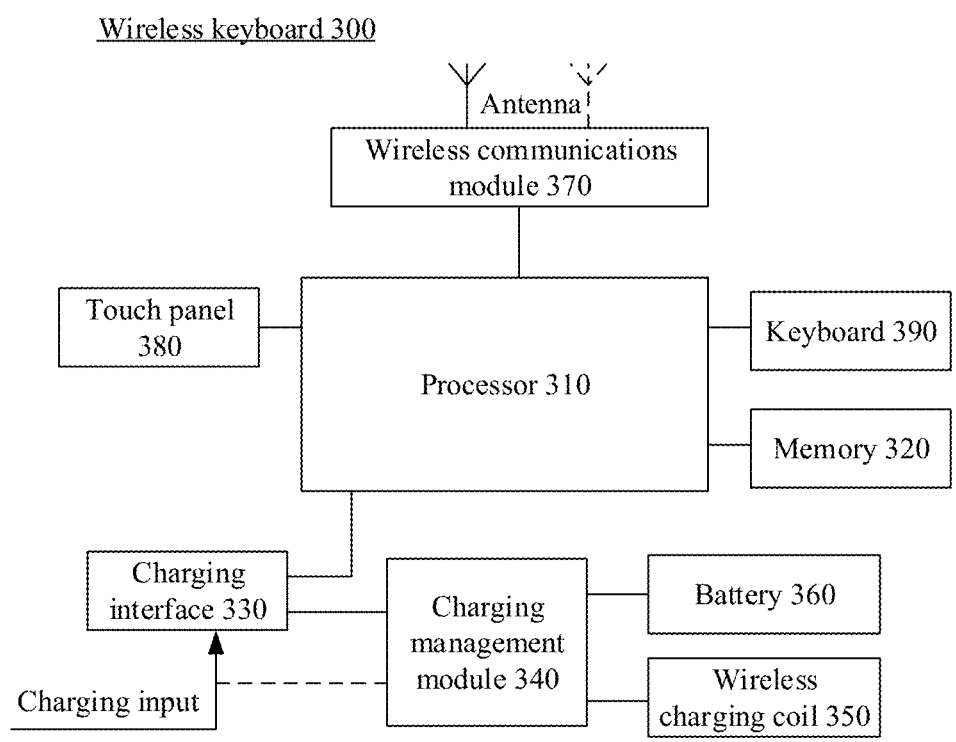
FIG. 8 is a schematic diagram of a hardware structure of a wireless keyboard according to an embodiment of this application.

FIG. 8 is a schematic diagram of a hardware structure of a wireless keyboard according to an embodiment of this application. Referring to FIG. 8, the wireless keyboard 300 may include a processor 310, a memory 320, a charging interface 330, a charging management module 340, a wireless charging coil 350, a battery 360, a wireless communications module 370, a touch panel 380, and a keyboard 390.

The processor 310, the memory 320, the charging interface 330, the charging management module 340, the battery 360, the wireless communications module 370, the touch panel 380, the keyboard 390, and the like may all be disposed on a keyboard body of the wireless keyboard 300 (that is, the second part 302 shown in FIG. 4). The wireless charging coil 350 may be disposed in a connecting portion 304 (as shown in FIG. 4) for movably connecting the keyboard body and a bracket. It should be understood that the structure illustrated in this embodiment does not constitute a specific limitation on the wireless keyboard 300. In some other embodiments, the wireless keyboard 300 may include more or fewer components than shown in the figure, or combine some components, or split some components, or have different component arrangements. The components shown in the figure may be implemented by using hardware, software, or a combination of software and hardware.

The memory 320 may be configured to store program code, such as program code for wirelessly charging the stylus 100. The memory 320 may further store a bluetooth address that uniquely identifies the wireless keyboard 300. In addition, the memory 320 may further store connection data of an electronic device that has been successfully paired with the wireless keyboard 300 before. For example, the connection data may be a bluetooth address of the electronic device that has been successfully paired with the wireless keyboard 300. Based on the connection data, the wireless keyboard 300 can be automatically paired with the electronic device without having to configure a connection therewith, for example, without performing a validity check. The bluetooth address may be a media access control (media access control, MAC) address.

The processor 310 may be configured to: execute the foregoing application program code, and invoke relevant modules to implement the functions of the wireless keyboard 300 in the embodiments of this application, for example, implementing a wired charging function, reverse wireless charging function, wireless communication function, and the like of the wireless keyboard 300. The processor 310 may include one or more processing units, and different processing units may be separate devices or may be integrated into one or more processors 310. The processor 310 may specifically be an integrated control chip, or may include a circuit including various active and/or passive components, and the circuit is configured to perform the functions of the processor 310 described in the embodiments of this application. The processor of the wireless keyboard 300 may be a microprocessor.

The wireless communications module 370 may be configured to support data exchange between the wireless keyboard 300 and other electronic devices over wireless communication including bluetooth (bluetooth, BT), global navigation satellite systems (global navigation satellite system, GNSS), wireless local area networks (wireless local area networks, WLAN) (for example, a wireless fidelity (wireless fidelity, Wi-Fi) network), frequency modulation (frequency modulation, FM), near field communication (near field communication, NFC) technology, infrared (infrared, IR) technology, and the like.

In some embodiments, the wireless communications module 370 may be a bluetooth chip. The wireless keyboard 300 may be a bluetooth keyboard. The wireless keyboard 300 may be paired and establish a wireless connection with a bluetooth chip of another electronic device through the bluetooth chip, so as to realize wireless communication between the wireless keyboard 300 and the another electronic device through the wireless connection.

In addition, the wireless communications module 370 may further include an antenna. The wireless communications module 370 receives an electromagnetic wave via the antenna, performs frequency modulation and filtering on an electromagnetic wave signal, and sends the processed signal to the processor 310. The wireless communications module 370 may also receive a to-be-sent signal from the processor 310, perform frequency modulation and amplification on the signal, and transmit the signal as an electromagnetic wave using the antenna.

In some embodiments, the wireless keyboard 300 may support wired charging. Specifically, the charging management module 340 may receive charging input of a wired charger through the charging interface 330.

In some other embodiments, the wireless keyboard 300 may support forward wireless charging. The charging management module 340 may receive wireless charging input through the wireless charging coil 350 of the wireless keyboard 300. Specifically, the charging management module 340 is connected to the wireless charging coil 350 through a matching circuit. The wireless charging coil 350 may be coupled to a wireless charging coil of a wireless charger, and respond to an alternating electromagnetic field emitted by the wireless charging coil of the wireless charger to produce an alternating current signal. The alternating current signal produced by the wireless charging coil 350 is transmitted to the charging management module 340 via the matching circuit, so as to charge the battery 360 wirelessly.

The charging management module 340 may further provide power for the wireless keyboard 300 while charging the battery 360. The charging management module 340 receives input from the battery 360 to provide power for the processor 310, the memory 320, an external memory, the wireless communications module 370, and the like. The charging management module 340 may further be configured to monitor parameters such as battery capacity of the battery 360, a cycle count of the battery, and a state of health (leakage and impedance) of the battery. In some other embodiments, the charging management module 340 may alternatively be disposed in the processor 310.

In some other embodiments, the wireless keyboard 300 may support reverse wireless charging. Specifically, the charging management module 340 may further receive input from the charging interface 330 or the battery 360, and convert a direct current signal input from the charging interface 330 or the battery 360 into an alternating current signal. The alternating current signal is transmitted to the wireless charging coil 350 through the matching circuit. The wireless charging coil 350 may generate an alternating electromagnetic field upon receiving the alternating current signal. A wireless charging coil of another mobile terminal may perform wireless charging through induction by responding to the alternating electromagnetic field. Therefore, the wireless keyboard 300 is also able to wirelessly charge other mobile terminals. In an embodiment, the wireless charging coil 350 may be disposed in an accommodating portion 303 of the wireless keyboard 300, and a wireless charging coil is disposed in the barrel assembly 20 of the stylus 100. When the stylus 100 is placed in the accommodating portion 303, the wireless keyboard 300 may charge the stylus 100 through the wireless charging coil 350.

It should be noted that the foregoing matching circuit may be integrated in the charging management module 340, or the matching circuit may be separate from the charging management module 340, which is not limited in the embodiments of this application. FIG. 8 is a schematic diagram of a hardware structure of the wireless keyboard 300 by using an example that the matching circuit may be integrated in the charging management module 340.

The charging interface 330 may be configured to provide a wired connection for charging or communication between the wireless keyboard 300 and another electronic device (for example, the wired charger of the wireless keyboard 300).

A touch sensor is integrated into the touch panel 380. A laptop may receive a control command of a user for the laptop through the touch panel 380 and the keyboard 390.

It should be understood that the structure illustrated in this embodiment of this application does not constitute a specific limitation on the wireless keyboard 300. The wireless keyboard 300 may have more or fewer components than shown in FIG. 8, may combine two or more components, or may have different component configurations. For example, a housing of the wireless keyboard 300 may further be provided with an accommodating chamber for accommodating the stylus 100. The wireless charging coil 350 is disposed in the accommodating chamber, and is configured to wirelessly charge the stylus 100 after the stylus 100 is accommodated in the accommodating chamber.

For another example, an outer surface of the wireless keyboard 300 may further include a key, an indicator light (which may indicate a state such as a battery level, an incoming/outgoing call, or a pairing mode), and a display (which may display alert information to a user), and other components. The key may be a physical key, a touch key (used with the touch sensor), or the like, and is configured to trigger operations such as power-on, power-off, start of charging, and end of charging.

However, in the related art, a pressure signal of the stylus 100 is transmitted and detected through a pressure sensitive assembly 60. The pressure sensitive assembly 60 is connected to the connecting end 12 of the tip assembly 10 through the mainshaft assembly 50, where the pressure sensitive assembly 60 is partly fixedly connected within the barrel assembly 20 and partly fixedly connected to the mainshaft assembly 50. With movement of the tip assembly 10 driving the mainshaft assembly 50 to move, the mainshaft assembly 50 drives the pressure sensitive assembly 60 to move, so as to cause the pressure sensitive assembly 60 to deform; and with the pressure sensitive assembly 60 connected to the circuit board 70, the circuit board 70 detects the pressure on the writing end 11 of the tip assembly 10 based on the deformation of the pressure sensitive assembly 60, so as to control line thickness of the writing end 11.

As the pressure sensitive assembly 60 is provided in the stylus 100 to transfer and detect a pressure signal, a large number of components have to be disposed in the stylus 100, complicating the manufacturing and assembling processes of the stylus 100, and increasing production costs of the stylus 100.

In this regard, the stylus 100 provided in this embodiment transmits a pressure signal to the pressure sensor assembly through the mainshaft that connects to the tip assembly, and detects the pressure by using the pressure sensor assembly, thereby avoiding a large number of components and complicated assembling processes caused by disposing the pressure sensitive assembly 60 in the stylus 100, simplifying a structure of the stylus 100 and reducing costs of the stylus 100, which improves detection sensitivity of the pressure signal and increases accuracy of positioning of the tip assembly 10.

The following describes in detail the stylus 100 in the embodiments of this application.

Figure 9:
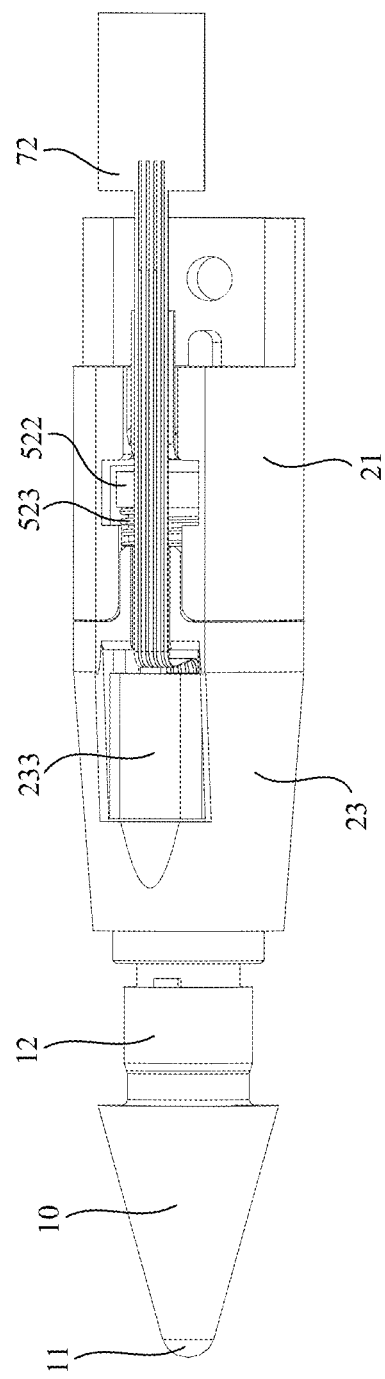
FIG. 9 is a partial structural diagram of a stylus according to an embodiment of this application.
Figure 10:
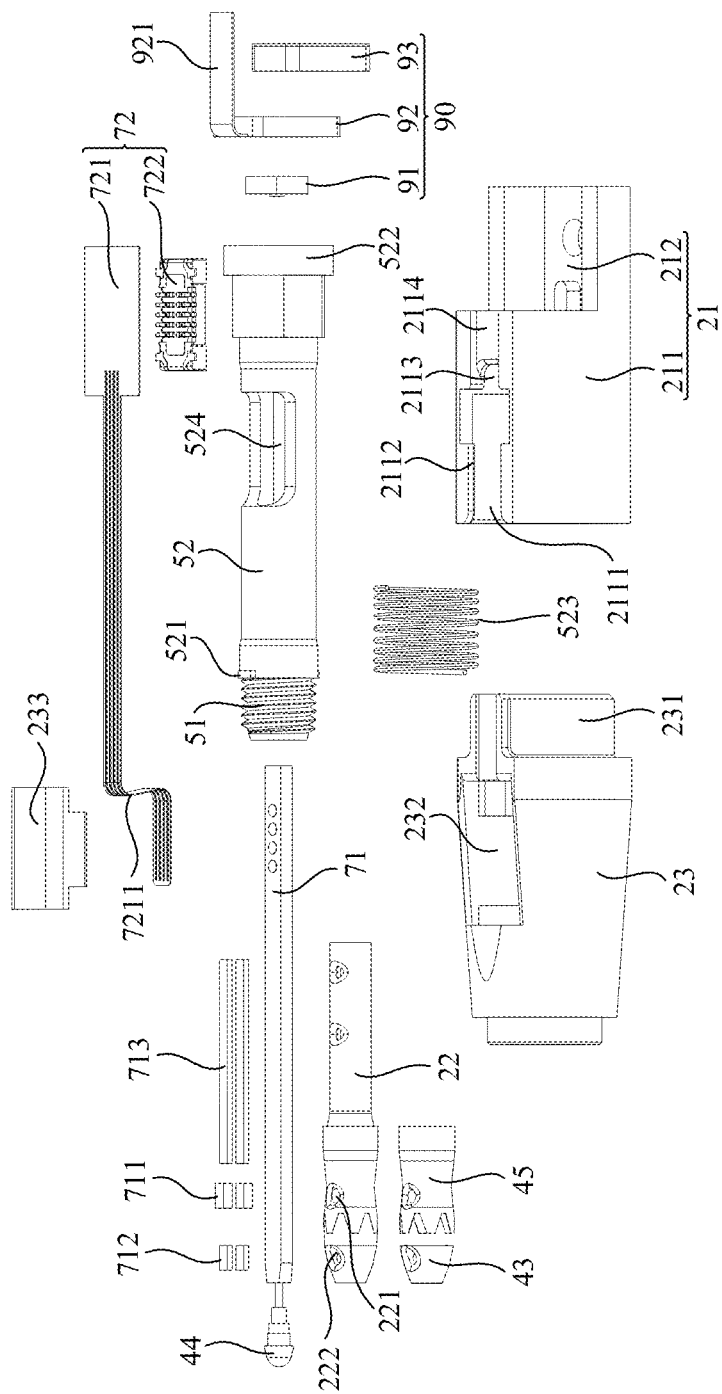
FIG. 10 is an exploded view of FIG. 9.
Figure 11:
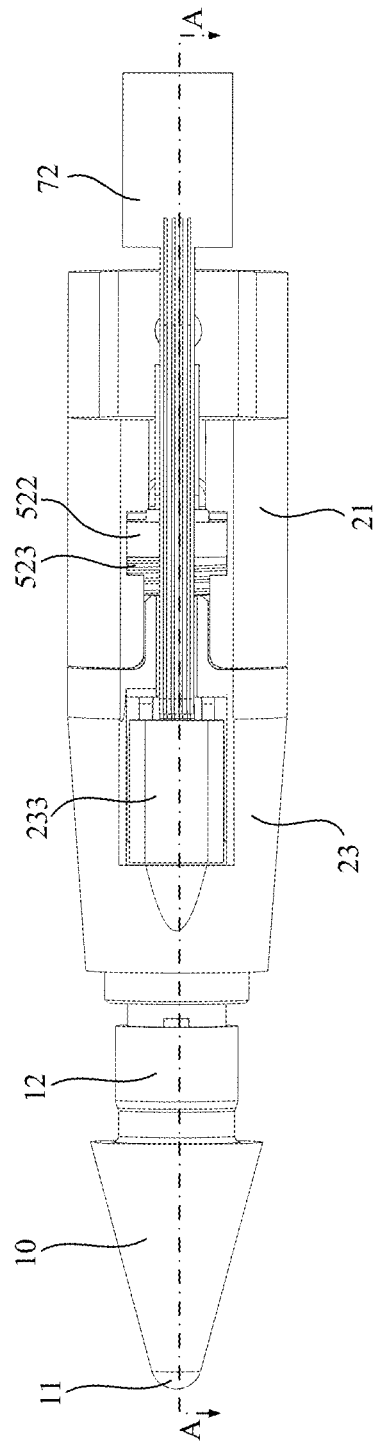
FIG. 11 is a main view of FIG. 9.
Figure 12:
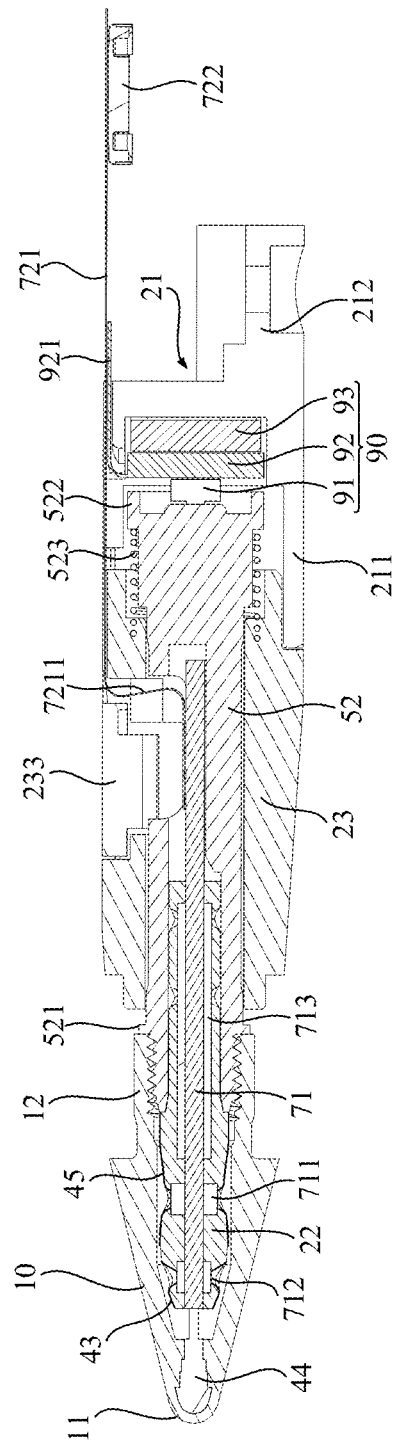
FIG. 12 is a cross-sectional view of FIG. 11 along a line A-A.
Figure 13:
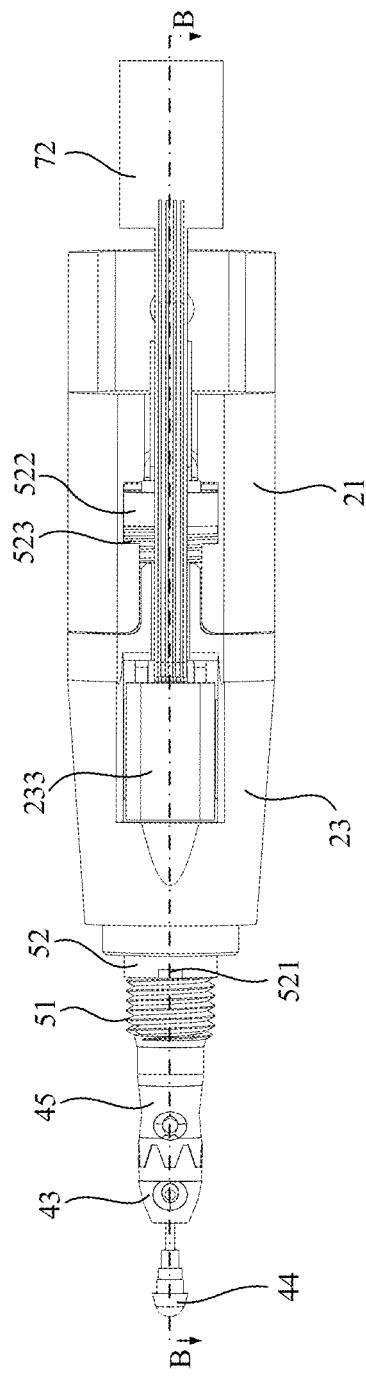
FIG. 13 is a main view of FIG. 9 with the tip assembly removed.
Figure 14:
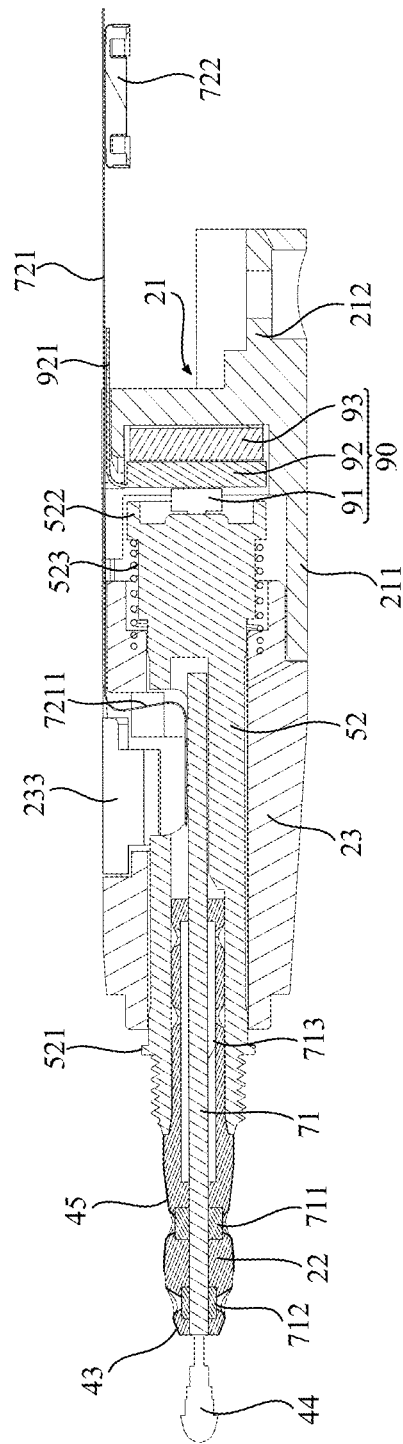
FIG. 14 is a cross-sectional view of FIG. 13 along a line B-B.

FIG. 9 is a partial structural diagram of a stylus according to an embodiment of this application; FIG. 10 is an exploded view of FIG. 9; FIG. 11 is a main view of FIG. 9; FIG. 12 is a cross-sectional view of FIG. 11 along a line A-A; FIG. 13 is a main view of FIG. 9 with the tip assembly removed; and FIG. 14 is a cross-sectional view of FIG. 13 along a line B-B.

Referring to FIG. 9, the stylus 100 provided in this embodiment includes a barrel assembly 20 (not shown in the figure) and a tip assembly 10, where the tip assembly 10 is located at an end of the barrel assembly 20, the tip assembly 10 is movably connected to the barrel assembly 20, a gap 10a is present at a connecting part between the tip assembly 10 and the barrel assembly 20, and the tip assembly 10 may move relative to the barrel assembly 20 within the gap 10a.

For ease of illustrating internal structures of the barrel assembly 20, the barrel assembly 20 is omitted in FIG. 9. It should be understood that the barrel assembly 20 is connected to the tip assembly 10, and structures located on a side of the barrel assembly 20 in the figure are all located inside the barrel assembly 20. The barrel assembly 20 is also omitted from FIG. 10 to FIG. 14, and only internal structures and components of the barrel assembly 20 are displayed therein, which is noted again.

When a user manipulates the stylus 100, the stylus 100 touches the touchscreen 201 of the electronic device 200 and puts a specific pressure on the touchscreen 201. According to the principle of acting force and reacting force, the tip assembly 10 will experience a responding pressure. In this case, the tip assembly 10 moves towards the barrel assembly 20 and transfers the pressure on the tip assembly 10 to the barrel assembly 20; and the barrel assembly 20 detects the pressure on the tip assembly 10 and adjusts thickness of lines written using the tip assembly 10 based on the pressure.

Specifically, referring to FIG. 10, the stylus 100 is provided with a first electrode 44, a signal board 71, and a control board (not shown in the figure). Referring to FIG. 11 and FIG. 12, the first electrode 44 is fixed at the writing end 11 of the tip assembly 10, the signal board 71 is disposed along an axis of the stylus 100 and partly located in the tip assembly 10, an end of the signal board 71 that extends into the tip assembly 10 connects to the first electrode 44, and the signal board 71 and the control board are electrically connected.

The first electrode 44 may be an emitter electrode. For example, the first electrode 44 is configured to transmit a first signal to the electronic device 200, and the electronic device 200 determines a position of the tip assembly 10 of the stylus 100 on the touchscreen 201 based on the first signal transmitted by the first electrode 44. The control board controls the first electrode 44 to transmit the first signal to the electronic device 200. For example, a controller is integrated into the control board, the controller transmits a control signal to the signal board 71, and the first electrode 44 transmits the first signal to the electronic device 200 according to the control signal.

For example, the first electrode 44 may be directly formed at the writing end 11 of the stylus 10 through an injection molding process. For example, the first electrode 44 is formed through a laser direct structuring (Laser Direct Structuring, LDS) process. With the signal board 71 extending into the tip assembly 10 and connecting to the first electrode 44, an overall structure of the first electrode 44 is concentrated at the writing end 11 of the tip assembly 10, which allows a relatively small distance between the first electrode 44 and the stylus 100 and a short signal transmission distance between the first electrode 44 and the electronic device 200, thereby improving accuracy of detection of a position of the tip assembly 10 of the stylus 100 by the electronic device 200.

In addition, due to cramped space within the tip assembly 10, the signal board 71 is typically designed as a narrow strip circuit board for ease of the signal board 71 to extend into the tip assembly 10. As the narrow strip signal board 71 generally has relatively low strength, during long-term use of the stylus 100, repeated movement of the signal board 71 driven by the tip assembly 10 may affect stability of the signal board 71 and further affect performance of the signal board 71.

Referring to FIG. 10, to enhance the strength of the signal board 71, a reinforcing member 713 may be connected to the signal board 71, and the reinforcing member 713 may cover part of surface areas on two sides of the signal board 71. With the reinforcing member 713 connected to the surface areas on the two sides of the signal board 71, the strength of the signal board 71 is enhanced to prevent the signal board 71 from warping or bending.

For example, the reinforcing member 713 may include at least two reinforcing plates, where the two reinforcing plates fit onto the surface areas on the two sides of the signal board 71 respectively; or the reinforcing plates may be a reinforcing block provided with a mounting recess 2114, where the signal board 71 snaps into the mounting recess 2114 of the reinforcing block. The reinforcing member 713 may have relatively high strength and stiffness. For example, the reinforcing member 713 is made of stainless steel.

Still referring to FIG. 10, the signal board 71 is connected to the control board via a flexible electrical connection assembly 72, and the flexible electrical connection assembly 72 may include a flexible circuit board 721 and an electrical connector 722. An end of the flexible circuit board 721 is connected to the signal board 71, the electrical connector 722 is connected to an end of the flexible circuit board 721 facing towards the control board, and the flexible circuit board 721 is connected to the control board through the electrical connector 722.

For example, the electrical connector 722 may be welded to the flexible circuit board 721 by using the surface mount technology (Surface Mount Technology, SMT), so as to constitute the flexible electrical connection assembly 72.

In this embodiment, a bending part 7211 may be provided between the two ends of the flexible circuit board 721, and the bending part enables the flexible circuit board 721 to have some telescopic allowance. When the tip assembly 10 moves relative to the barrel assembly 20, for example, when the tip assembly 10 moves away from the barrel assembly 20, the tip assembly 10 drives the first electrode 44 and the signal board 71 to move away from the barrel assembly 20, so that a distance between the signal board 71 and the signal board fixed in the barrel assembly 20 increases, the flexible circuit board 721 connected between signal board 71 and the signal board is stretched, and the bending part on the flexible circuit board 721 is opened up when the flexible circuit board 721 is stretched, preventing the flexible circuit board 721 from being pulled, avoiding tearing of the flexible circuit board 721 over long-term use, and guaranteeing electrical properties between the signal board 71 and the control board.

Still referring to FIG. 10, the stylus 100 is further provided with a pressure sensor assembly 90 and a mainshaft 52. With reference to FIG. 11 and FIG. 12, the pressure sensor assembly 90 is fixed in the barrel assembly 20. For example, the pressure sensor assembly 90 is disposed close to the control board, and the pressure sensor assembly 90 is electrically connected to the control board. The mainshaft 52 is disposed along the axis of the stylus 100, one end of the mainshaft 52 being connected to the tip assembly 10 and the other end of the mainshaft 52 touching the pressure sensor assembly 90.

When the tip assembly 10 moves towards the barrel assembly 20, the tip assembly 10 drives the mainshaft 52 to move towards the pressure sensor assembly 90 so that the mainshaft 52 exerts a pressure on the pressure sensor assembly 90. The pressure sensor assembly 90 detects the pressure from the mainshaft 52 and transfers the pressure signal to the control board, and the control board determines the pressure on the tip assembly 10 based on the pressure signal and controls thickness of lines written using the tip assembly 10 based on the pressure on the tip assembly 10.

Compared with the solution shown in FIG. 2B where the barrel assembly 20 is provided with the pressure sensitive assembly 60, a pressure signal is transferred through deformation of the pressure sensitive assembly 60 itself, and a pressure on the tip assembly 10 is detected through a strain gage sensing the deformation of the pressure sensitive assembly 60, in this embodiment, the barrel assembly 20 is provided with the pressure sensor assembly 90, and a pressure on the tip assembly 10 is transferred through the mainshaft 52 to the pressure sensor assembly 90 which detects pressure on the tip assembly 10, simplifying a transfer manner of the pressure on the tip assembly 10. In addition, high accuracy of detection of the pressure sensor assembly 90 allows improved accuracy of detection of the pressure on the tip assembly 10, thereby improving writing resolution of the tip assembly 10.

In addition, the pressure on the tip assembly 10 is transferred to the pressure sensor assembly 90 through the mainshaft 52, without the pressure sensitive assembly 60 that transfers pressure and deforms disposed in the stylus 100, so that fewer components are disposed in the stylus 100, simplifying manufacturing and assembling processes of the stylus 100 and reducing costs of the stylus 100.

Still referring to FIG. 10, the stylus 100 is further provided with a second electrode 45, and the second electrode 45 is electrically connected to the control board. For example, the second electrode 45 may be configured to detect a tilt angle of the stylus 100 relative to the touchscreen 201. For example, taking the first electrode 44 in the writing end 11 of the tip assembly 10 as a reference, the tilt angle of the stylus 100 is determined according to a relative positional relationship between the second electrode 45 and the first electrode 44.

In an implementation, the second electrode 45 may be an emitter electrode. For example, the second electrode 45 is configured to transmit a second signal to the electronic device 200, and the electronic device 200 determines the tilt angle of the stylus 100 relative to the touchscreen 201 based on the second signal transmitted by the second electrode 45. When the second electrode 45 is an emitter electrode, the second electrode 45 is the foregoing second emitter electrode 42.

In another implementation, the second electrode 45 may both transmit a second signal to the electronic device 200 and receive a signal transmitted by the electronic device 200 to the stylus 100. The second electrode 45 may transmit the received signal to the control board, and the control board controls the stylus 100 to execute a command sent by the electronic device 200 according to a received control signal.

In the case that the second electrode 45 may both transmit and receive signals, the second electrode 45 may include a signal transmitting module and a signal receiving module. The signal transmitting module is configured to transmit the second signal to the electronic device 200, and the electronic device 200 determines the tilt angle of the stylus 100 based on the second signal transmitted by the signal transmitting module of the second electrode 45; and the signal receiving module is configured to receive the signal transmitted by the electronic device 200 to the stylus 100, and the control board of the stylus 100 controls the stylus 100 to execute the command sent by the electronic device 200 according to the signal received by the signal receiving module of the second electrode 45.

Alternatively, in other implementations, a separate receiving electrode is provided in the stylus 100, where the receiving electrode is electrically connected to the control board, and the stylus 100 receives a signal transmitted by the electronic device 200 to the stylus 100 through the receiving electrode. The following descriptions all assume that the second electrode 45 may both transmit a second signal to the electronic device 200 and receive a signal transmitted by the electronic device 200 to the stylus 100, which is not noted again.

Referring to FIG. 11 and FIG. 12, specifically, the second electrode 45 fits around the signal board 71 and is electrically connected to the signal board 71, the control board transmits a control signal to the signal board 71, the second electrode 45 transmits a second signal to the electronic device 200 according to the control signal, and the electronic device 200 determines the tilt angle of the stylus 100 based on the received second signal.

With the second electrode 45 fitting around the signal board 71, when the tip assembly 10 drives the first electrode 44 and the signal board 71 to move, the second electrode 45 moves as the tip assembly 10 moves so that relative positions of the second electrode 45 and the first electrode 44 remain unchanged. Therefore, the electronic device 200 can accurately measure the tilt angle of the stylus 100. Cooperation between the first electrode 44 and the second electrode 45 allows the electronic device 200 to accurately measure the position of the stylus 100 on the touchscreen 201 and the tilt angle of the stylus 100 relative to the touchscreen 201.

Still referring to FIG. 10, in this embodiment, the pressure sensor assembly 90 may include a pressure sensor 91 and an electrical connecting member 92. The pressure sensor 91 is configured to detect a pressure on the tip assembly 10, and the electrical connecting member 92 is configured to electrically connect the pressure sensor 91 to the control board and transmit a pressure signal detected by the pressure sensor 91 to the control board. The control board determines the pressure on the tip assembly 10 based on the pressure signal and transmits a corresponding control signal to the signal board 71 based on the pressure on the tip assembly 10, so as to control thickness of lines written using the tip assembly 10.

Referring to FIG. 12, one side surface of the pressure sensor 91 abuts against an end of the mainshaft 52, the electrical connecting member 92 is connected to the other side surface of the pressure sensor 91, and the electrical connecting member 92 is electrically connected to the control board. When the tip assembly 10 moves towards the barrel assembly 20, the mainshaft 52 moves towards the pressure sensor 91 and squeezes the pressure sensor 91, and the pressure sensor 91 detects a pressure from the mainshaft 52 and transfers a pressure signal to the control board through the electrical connecting member 92.

The electrical connecting member 92 is for example a printed circuit board (Printed Circuit Board, PCB), the pressure sensor 91 is connected to the PCB which may have a pin 921 extending from an outer edge, and the pin 921 of the PCB is connected to the control board, so as to implement electrical connection between the pressure sensor 91 and the control board.

To improve accuracy of detection of the pressure on the tip assembly 10 by the pressure sensor 91, in this embodiment, an axis of the mainshaft 52 and a central axis of the pressure sensor 91 both may coincide with a central axis of the barrel assembly 20. In a case that the stylus 100 rotates to different orientations in a user's hand, with the axis of the mainshaft 52 coinciding with the central axis of the barrel assembly 20, the pressure on the tip assembly 10 is always transferred along a straight line to the mainshaft 52; and with the central axis of the pressure sensor 91 coinciding with the central axis of the barrel assembly 20, the mainshaft 52 transfers the pressure on the tip assembly 10 along a straight line to the pressure sensor 91.

With the pressure on the tip assembly 10 transferred straightly along a central axis of the stylus 100 to the pressure sensor 91, linearity and isotropy of the force can be improved. Therefore, when the stylus 100 rotates to different orientations in the user's hand, if the pressure from the tip assembly 10 remains unchanged, the pressure detected by the pressure sensor 91 does not change. In this way, thickness of lines written using the tip assembly 10 as controlled by the control board based on the pressure detected by the pressure sensor 91 remains unchanged. In this way, accuracy of detection of the pressure on the tip assembly 10 by the pressure sensor 91 can be improved, thereby improving writing resolution of the stylus 100.

Referring to FIG. 12, in some implementations, the pressure sensor assembly 90 may further include a buffer 93, and the buffer 93 fits onto a side surface of the electrical connecting member 92 facing away from the pressure sensor 91. Specifically, the buffer 93 is used to buffer a force acting on the pressure sensor 91. When the pressure on the tip assembly 10 is excessively large and the force exerted by the mainshaft 52 on the pressure sensor 91 is excessively large, the force acting on the buffer 93 by the pressure sensor 91 can cause the buffer 93 to deform to some extent, allowing slight movement of the pressure sensor 91 away from the mainshaft 52 to buffer the pressure acting on the pressure sensor 91, so as to avoid performance impairment of the pressure sensor 91 due to excessive pressure.

For example, the buffer 93 may be an elastic member 523 with some strength such as a rubber member or a silicone member.

When the pressure sensor assembly 90 is assembled, the pressure sensor 91 may be connected to the electrical connecting member 92 first, for example, the pressure sensor 91 is welded to the PCB; and then the electrical connecting member 92 may be fixed to the buffer 93, for example, the PCB is bonded to the buffer 93 by using back glue.

Still referring to FIG. 10, the stylus 100 is further provided with a fixed bracket 21, and the fixed bracket 21 is fixed in the barrel assembly 20. The fixed bracket 21 is configured to fix the pressure sensor assembly 90 in the barrel assembly 20. Specifically, the fixed bracket 21 includes a main body 211 which includes accommodating chamber 2111 inside, where an opening is provided at an end of the main body 211 facing towards the mainshaft 52, the opening communicates with the accommodating chamber 2111, and the pressure sensor assembly 90 is installed into the accommodating chamber 2111 through the opening.

In actual application, the pressure sensor assembly 90 may be fixed by bonding in the accommodating chamber 2111 of the main body 211 of the fixed bracket 21. For example, a buffer pad of the pressure sensor assembly 90 is bonded onto a bottom end surface of the accommodating chamber 2111 by using back glue. The bottom end surface of the accommodating chamber 2111 is the bottom surface opposite to the opening of the accommodating chamber 2111.

In addition, referring to FIG. 10, a positioning hole 2113 may be provided in a side wall of the main body 211 of the fixed bracket 21. The positioning hole 2113 corresponds to a position of the electrical connecting member 92 (for example the PCB), and the pin 921 of the electrical connecting member 92 extends outside the fixed bracket 21 through the positioning hole 2113; and the mounting recess 2114 may be provided in an outer wall of the main body 211 of the fixed bracket 21 at an end facing towards the control board, the mounting recess 2114 communicates with the positioning hole 2113, and after extending outwards to the positioning hole 2113, the pin 921 of the electrical connecting member 92 extends along the mounting recess 2114 towards the control board.

In an implementation, the control board is fixed in the barrel assembly 20 by using the fixed bracket 21. Specifically, referring to FIG. 10, the fixed bracket 21 may further include a support plate 212, the support plate 212 is connected to a side of the main body 211 facing away from the mainshaft 52, at least part of the control board is located on the support plate 212, and the control board is fixedly connected to the support plate 212, for example, an end of the control board is connected to the support plate 212 through welding, bonding or a connector such as a screw or a bolt.

Still referring to FIG. 10, the stylus 100 may be further provided with an insulating sleeve 22, the insulating sleeve 22 fits around the signal board 71, and the second electrode 45 fits around an outer wall of the insulating sleeve 22. In this way, the insulating sleeve 22 can be used to fix the second electrode 45 and implement electrical connection between the second electrode 45 and the signal board 71. In addition, interference between the second electrode 45 and the signal board 71 can be lessened by insulating isolation provided by the insulating sleeve 22.

Specifically, referring to FIG. 13 and FIG. 14, a first through hole 221 is provided in the insulating sleeve 22, a first conductive member 711 fits around the signal board 71, a position of the first conductive member 711 corresponds to that of the first through hole 221, and the second electrode 45 extends partly into the first through hole 221 and touches the first conductive member 711, implementing the electrical connection between the second electrode 45 and the signal board 71.

In addition, referring to FIG. 10, the stylus 100 may be further provided with a ground electrode 43, and the ground electrode 43 is used to lessen signal interference between the second electrode 45 and the first electrode 44. The ground electrode 43 may also fit around the insulating sleeve 22, so that the insulating sleeve 22 fixes both the second electrode 45 and the ground electrode 43, and the signal board 71 is insulated from the second electrode 45 and the ground electrode 43.

The ground electrode 43 is located at a side of the second electrode 45 closer to the first electrode 44 so that the ground electrode 43 is located between the first electrode 44 and the second electrode 45, well lessening the signal interference between the first electrode 44 and the second electrode 45 by the ground electrode 43.

Similar to the electrical connection between the second electrode 45 and the signal board 71, a second through hole 222 is also provided in the insulating sleeve 22, a second conductive member 712 also fits around the signal board 71, a position of the second conductive member 712 corresponds to that of the ground electrode 43, and the ground electrode 43 extends partly into the second through hole 222 and touches the second conductive member 712, implementing electrical connection between the ground electrode 43 and the signal board 71.

The insulating sleeve 22 fitting around the signal board 71 can enhance the strength of the signal board 71. Referring to FIG. 14, the insulating sleeve 22 extends into the mainshaft 52 and connects to the mainshaft 52, and the first electrode 44 and the signal board 71 are fixedly connected to the mainshaft 52 via the insulating sleeve 22. In this way, the first electrode 44, the signal board 71, the insulating sleeve 22 and the mainshaft 52 form a whole which moves as the tip assembly 10 moves.

In actual application, when the signal board 71, the insulating sleeve 22 and the mainshaft 52 are assembled, the reinforcing member 713, the first conductive member 711, and the second conductive member 712 may be fixed to the signal board 71 first. For example, the reinforcing member 713, the first conductive member 711, and the second conductive member 712 are all mounted onto a surface of the signal board 71 through an SMT process; then, the reinforcing member 713, the first conductive member 711, the second conductive member 712, and the signal board 71, as a whole, are combined with the insulating sleeve 22 through an in-mold decoration (In-Mold Decoration, IMD) process; and then, the second electrode 45 and the ground electrode 43 are injection-molded onto the outer wall of the insulating sleeve 22 through an LDS process.

After the signal board 71, the insulating sleeve 22, the second electrode 45, and the ground electrode 43 are assembled together, they are assembled into the mainshaft 52 as a whole. For example, glue is dispensed in a local region on the outer wall of the insulating sleeve 22, and the insulating sleeve 22 is fixed inside the mainshaft 52 by the dispensed glue. Glue dispensing is a type of technical process, also known as glue applying, glue spreading, glue potting, glue dipping, and the like, which is to spread, embed, or dip electronic glue, oil or other liquids onto a product, so that the product is adhered, potted, insulated, fixed, or surface-smoothed.

Still referring to FIG. 10, the stylus 100 may be further provided with a fixed sleeve 23. Referring to FIG. 14, the fixed sleeve 23 is fixed in the barrel assembly 20, the mainshaft 52 extends into the fixed sleeve 23, and the fixed sleeve 23 is able to guide the movement of the mainshaft 52. When the mainshaft 52 moves within the barrel assembly 20, the mainshaft 52 moves along an inner wall of the fixed sleeve 23, and the fixed sleeve 23 can ensure moving of the mainshaft 52 along the axis of the barrel assembly 20, preventing the mainshaft 52 from deviating from the axis of the stylus 100 during moving, so as to avoid compromise of the accuracy of detection of the pressure on the tip assembly 10 by the pressure sensor 91.

In addition, the fixed sleeve 23 can also limit a movement range of the mainshaft 52. Specifically, referring to FIG. 14, a first limit part 521 may be provided on an outer wall of the mainshaft 52 at an end facing towards the tip assembly 10, for example, the first limit part 521 is an annular stopper protruding from the outer wall of the mainshaft 52 and extending along the outer wall of the mainshaft 52 in a circumferential direction. When the tip assembly 10 moves towards the barrel assembly 20, the first limit part 521 may abut against an end of the fixed sleeve 23 facing towards the tip assembly 10. In this way, the limit part 521 can limit a movement range of the tip assembly 10.

It should be noted that, when the tip assembly 10 is experiencing no pressure, a distance between the first limit part 521 and the end of the fixed sleeve 23 facing towards the tip assembly 10 can be less than the gap 10*a* between the tip assembly 10 and the barrel assembly 20. In this way, when the tip assembly 10 moves to an extent that the first limit part 521 abuts against the end of the fixed sleeve 23, there is still a small gap present between the tip assembly 10 and the barrel assembly 20, avoiding collision between the tip assembly 10 and the barrel assembly 20 and ensuring smooth movement of the tip assembly 10.

Still referring to FIG. 14, a second limit part 522 may also be provided on the outer wall of the mainshaft 52 at an end facing away from the tip assembly 10. Similar to the first limit part 521, the second limit part 522 is for example an annular stopper protruding from the outer wall of the mainshaft 52 and extending along the outer wall of the mainshaft 52 in a circumferential direction. An elastic member 523 is also provided fitting around the outer wall of the mainshaft 52, and the elastic member 523 is clipped between an end of the fixed sleeve 23 facing away from the tip assembly 10 and the second limit part 522 on the mainshaft 52.

With the elastic member 523 clipped between the end of the fixed sleeve 23 and the second limit part 522, the elastic member 523 which is for example a pre-compressed spring is in compression when the tip assembly 10 is experiencing no pressure. In this way, when the tip assembly 10 is experiencing no pressure, a force acting on the mainshaft 52 from an elastic force produced by the compression of the elastic member 523 can guarantee close contact between the mainshaft 52 and the pressure sensor 91. When the tip assembly 10 is experiencing a pressure and drives the mainshaft 52 to move towards the barrel assembly 20, a force acting on the pressure sensor 91 from the mainshaft 52 increases. Therefore, the provision of the pre-compressed elastic member 523 can guarantee constant contact between the mainshaft 52 and the pressure sensor 91, so as to improve accuracy of detection of the pressure on the tip assembly 10 by the pressure sensor 10.

It should be noted that, a pre-pressure on the pressure sensor 91 from the elastic member 523 when the tip assembly 10 is experiencing no pressure may be used as a reference value. When the tip assembly 10 moves under a pressure, the pressure on the sensor 91 from the mainshaft 52 increases, and the reference value is subtracted from a pressure detected by the sensor 91 to obtain an actual detected pressure on the tip assembly 10.

Referring to FIG. 10, to fix the fixed sleeve 23 and the fixed bracket 21 in the barrel assembly 20, in an implementation, a limit bar 231 is provided at an end of the fixed sleeve 23 facing towards the fixed bracket 21, a limit recess 2112 is provided in a side wall of the main body 211 of the fixed bracket 21, and the limit bar 231 of the fixed sleeve 23 snaps into the limit recess 2112 of the fixed bracket 21.

With the cooperation between the limit bar 231 of the fixed sleeve 23 and the limit recess 2112 of the fixed bracket 21, spinning of the fixed sleeve 23 and the fixed bracket 21 in the barrel assembly 20 can be prevented. In this way, to install the fixed sleeve 23 and the fixed bracket 21, either one of the fixed sleeve 23 and the fixed bracket 21 may be fixed in the barrel assembly 20. For example, the fixed bracket 21 is fixed in the barrel assembly 20 through manners such as welding or glue dispensing, and the fixed sleeve 23 is fixed in the barrel assembly 20 through the cooperation between the limit bar 231 of the fixed sleeve 23 and the limit recess 2112 of the fixed bracket 21, without additional fixing of the fixed sleeve 23.

Alternatively, to ensure firm connection of the fixed sleeve 23 in the barrel assembly 20, on the basis that the fixed bracket 21 is fixed in the barrel assembly 20 and that the fixed sleeve 23 is plugged fixedly to the fixed bracket 21 via the limit bar 231, an outer wall of the fixed sleeve 23 may also be connected to an inner wall of the barrel assembly 20 or a fixed part in the barrel assembly 20 through manners such as welding or glue dispensing.

As previously described, the flexible circuit board 721 of the flexible electrical connection assembly 72 is connected to the signal board 71. Specifically, the flexible circuit board 721 may be disposed along outer walls of the fixed bracket 21 and the fixed sleeve 23. That is, part of the flexible circuit board 721 fits onto the outer walls of the fixed bracket 21 and the fixed sleeve 23, and the flexible circuit board 721 extends along the outer walls of the fixed bracket 21 and the fixed sleeve 23, so that this part of the flexible circuit board 721 is fixed by the fixed bracket 21 and the fixed sleeve 23.

For example, the part of the flexible circuit board 721 located on the outer walls of the fixed bracket 21 and the fixed sleeve 23 may be fixed onto the outer walls of the fixed bracket 21 and the fixed sleeve 23 through glue dispensing.

Referring to FIG. 14, the flexible circuit board 721 extends along the fixed bracket 21 and the fixed sleeve 23, and the flexible circuit board 721 extends into the mainshaft 52 through side walls of the fixed sleeve 23 and the mainshaft 52 and connects to the signal board 71. Specifically, referring to FIG. 10, a first mounting hole 524 is provided in the side wall of the mainshaft 52, a second mounting hole 232 is provided in the side wall of the fixed sleeve 23, where the second mounting hole 232 communicates with the first mounting hole 524, and the flexible circuit board 721 extends into the mainshaft 52 through the second mounting hole 232 and the first mounting hole 524 and connects to the signal board 71.

Still referring to FIG. 14, the bending part 7211 of the flexible circuit board 721 is disposed corresponding to locations of the first mounting hole 524 and the second mounting hole 232, and the flexible circuit board 721 extending along the outer walls of the fixed bracket 21 and the fixed sleeve 23 changes the direction of extension via the bending part 7211. For example, the bending part 7211 may extend roughly along a radial direction of the barrel assembly 20. In this way, the flexible circuit board 721 extends along the inner wall of the barrel assembly 20 towards the central axis of the barrel assembly 20, so that an end of the flexible circuit board 721 extends to fit onto the signal board 71.

In addition, the bending part 7211 of the flexible circuit board 721 may have some allowance. For example, a length of the bending part 7211 may be greater than a distance between the outer wall of the fixed sleeve 23 and a board surface of the signal board 71. In this way, when the tip assembly 10 is experiencing no pressure, the bending part 7211 of the flexible circuit board 721 is relaxed; and when the tip assembly 10 moves towards the barrel assembly 20 under a pressure, a distance between the signal board 71 and the control board is shortened, and the formerly relaxed bending part 7211 of the flexible circuit board 721 remains relaxed. In this way, the flexible circuit board 721 can be prevented from being pulled when the tip assembly 10 moves away from the barrel assembly 20, avoiding tear or fracture of the flexible circuit board 721 over long-term use and ensuring long-term service performance of the flexible circuit board 721.

Still referring to FIG. 10, in some implementations, an end cover 233 may be provided to cover the second mounting hole 232 of the fixed sleeve 23. Referring to FIG. 14, with the end cover 233 covering the second mounting hole 232, the outer wall of the fixed sleeve 23 has a relatively complete surface, making it convenient to dispose components in a space between the outer wall of the fixed sleeve 23 and the inner wall of the barrel assembly 20, for example, dispose lines on the outer wall of the fixed sleeve 23.

For example, the end cover 233 may be flush with the outer wall of the fixed sleeve 23, allowing the fixed sleeve 23 to have a smooth surface, which helps dispose flexible components on the outer wall of the fixed sleeve 23.

In addition, referring to FIG. 14, a gap may be present between the end cover 233 and an inner wall of a local region of the second mounting hole 232. For example, a gap is present between the end cover 233 and an inner wall of the second mounting hole 232 on a side closer to the pressure sensor assembly 90, and the bending part 7211 of the flexible circuit board 721 is located in the gap, preventing the end cover 233 from squeezing the flexible circuit board 721 to cause the flexible circuit board 721 to be worn out or fractured over long-term use. When moving, the tip assembly 10 drives the bending part 7211 of the flexible circuit board 721 to move within the gap, protecting the flexible circuit board 721 from being squeezed or worn out.

In the stylus 100 provided in this embodiment, the mainshaft 52 and the pressure sensor assembly 90 are disposed, one end of the mainshaft 52 is connected to the tip assembly 10, and the pressure sensor assembly 90 is fixed in the barrel assembly 20 and touching the other end of the mainshaft 52. The tip assembly 10 moves under a pressure and drives the mainshaft 52 to move, the mainshaft 52 moves towards the barrel assembly 20 and transfers the pressure on the tip assembly 10 to the pressure sensor assembly 90, and the pressure sensor assembly 90 detects the pressure on the tip assembly 10. In this way, a transfer manner of the pressure on the tip assembly 10 is simplified so that fewer components are disposed in the stylus 100, simplifying manufacturing and assembling processes of the stylus 100 and reducing costs of the stylus 100. In addition, this can improve the accuracy of detection of the pressure on the tip assembly 10, thereby improving writing resolution of the tip assembly 10.

With the signal board 71 extending into the tip assembly 10 and connecting to the first electrode 44 located at the writing end 11 of the tip assembly 10, a size of the first electrode 44 is reduced, a distance between the first electrode 44 and the touchscreen 201 is shortened, and accuracy of positioning of the tip assembly 10 of the stylus 100 by the electronic device 200 is improved. In addition, with the second electrode 45 fitting around the signal board 71, the moving of the tip assembly 10 can drive the first electrode 44 and the second electrode 45 to move synchronously so that relative positions of the second electrode 45 and the first electrode 44 remain unchanged, improving measurement accuracy of a tilt angle of the stylus 100 relative to the touchscreen 201 by the electronic device 200.

With the two ends of the flexible electrical connection assembly 72 connected to the signal board 71 and the control board respectively, signals can be transmitted between the signal board 71 and the control board. In addition, with the bending part 7211 disposed between the two ends of the flexible electrical connection assembly 72, the bending part 7211 enables the flexible electrical connection assembly 72 to have some extension allowance, preventing the flexible electrical connection assembly 72 from being torn or damaged due to pulling when the tip assembly 10 moves away from the barrel assembly 20, thereby ensuring long-term service performance of the flexible electrical connection assembly.

In the description of the embodiments of this application, it should be noted that, unless otherwise specified and defined explicitly, the terms "mount", "connect", and "join" should be understood in their general senses. For example, they may refer to a fixed connection or an indirect connection through an intermediate medium; or they may refer to an internal communication between two components or an interaction between two components. Persons of ordinary skill in the art can understand specific meanings of these terms in this application as appropriate to specific situations.

In the specification, claims, and accompanying drawings of the embodiments of this application, the terms "first", "second", "third", "fourth", and so on (if existent) are intended to distinguish between similar objects but do not necessarily indicate a specific order or sequence.

The invention claimed is:

1. A stylus comprising:
   a barrel assembly and a tip assembly, wherein the tip assembly is located at an end of the barrel assembly and a gap is present between the tip assembly and the barrel assembly;
   a first electrode, a second electrode, a signal board, a mainshaft, a pressure sensor assembly, a control board, and a flexible electrical connection assembly,
   wherein one end of the first electrode is located at a writing end of the tip assembly, the signal board extends into the tip assembly and connects to another end of the first electrode, and the second electrode fits around the signal board and is electrically connected to the signal board, and
   wherein the pressure sensor assembly is fixed in the barrel assembly, one end of the mainshaft is connected to the tip assembly, another end of the mainshaft is coupled to the pressure sensor assembly to transfer pressure from the tip assembly to the pressure sensor assembly, the pressure sensor assembly is electrically connected to the control board, one end of the flexible electrical connection assembly is connected to the signal board, another end of the flexible electrical connection assembly is electrically connected to the control board, and a bending portion is present between the one end and the another end of the flexible electrical connection assembly, and
   wherein the flexible electrical connection assembly comprises a flexible circuit board and an electrical connector, with the electrical connector connected to an end of the flexible circuit board facing towards the control board and the bending portion located on the flexible circuit board, and
   wherein the pressure sensor assembly comprises a pressure sensor and an electrical connecting member, wherein one side surface of the pressure sensor abuts against an end of the mainshaft, the electrical connecting member is connected to another side surface of the pressure sensor, and the electrical connecting member is electrically connected to the control board;
   a fixed bracket, wherein the fixed bracket is fixed in the barrel assembly and the fixed bracket comprises a main body with an accommodating chamber, an opening of the accommodating chamber facing the mainshaft and the pressure sensor assembly being located in the accommodating chamber; and an insulating sleeve, wherein the insulating sleeve fits around the signal board, the second electrode fits around an outer wall of the insulating sleeve, and the insulating sleeve extends partly into the mainshaft and connects to the mainshaft, wherein a first through hole is provided in the insulating sleeve, a first conductive member fits around the signal board, and the second electrode extends partly into the first through hole and touches the first conductive member, and wherein an elastic member fits around the outer wall of the mainshaft, a second limit part is provided on the outer wall of the mainshaft at an end facing away from the tip assembly, and the elastic member is clipped between an end of a fixed sleeve facing away from the tip assembly and the second limit part.

2. The stylus according to claim 1, wherein central axes of the mainshaft and the pressure sensor both coincide with a central axis of the barrel assembly.

3. The stylus according to claim 2, wherein the fixed bracket further comprises a support plate, the support plate is connected to a side of the main body facing away from the mainshaft, and an end of the control board is connected to the support plate.

4. The stylus according to claim 2, further comprising a reinforcing member, wherein the reinforcing member covers part of surface areas on two sides of the signal board.

5. The stylus according to claim 2, wherein the first electrode is an emitter electrode and the second electrode comprises a signal transmitting module and a signal receiving module.

6. The stylus according to claim 1, wherein the pressure sensor assembly further comprises a buffer and the buffer fits onto a side surface of the electrical connecting member facing away from the pressure sensor.

7. The stylus according to claim 1, further comprising a ground electrode, wherein the ground electrode fits around the outer wall of the insulating sleeve and the ground electrode is located on a side of the second electrode closer to the first electrode; wherein a second through hole is provided in the insulating sleeve, a second conductive member fits around the signal board, and the ground electrode extends partly into the second through hole and touches the second conductive member.

8. The stylus according to claim 7, wherein the fixed sleeve is fixed in the barrel assembly, the mainshaft extends into the fixed sleeve, and a first limit part is provided on an outer wall of the mainshaft at an end facing towards the tip assembly, wherein the first limit part is configured to abut against an end of the fixed sleeve facing towards the tip assembly when the tip assembly is moving towards the barrel assembly.

9. The stylus according to claim 1, wherein a limit bar is provided at an end of the fixed sleeve facing towards the fixed bracket, a limit recess is provided in a side wall of the main body of the fixed bracket, and the limit bar snaps into the limit recess.

10. The stylus according to claim 1, wherein a first mounting hole is provided in a side wall of the mainshaft, a second mounting hole is provided in a side wall of the fixed sleeve, the second mounting hole communicates with the first mounting hole, and an end of the flexible electrical connection assembly extends into the mainshaft through the second mounting hole and the first mounting hole and connects to the signal board.

11. The stylus according to claim 10, wherein
the flexible circuit board extends along outer walls of the fixed bracket and the fixed sleeve, and the bending portion passes through the second mounting hole and the first mounting hole so that an end of the flexible circuit board fits onto the signal board.

12. An electronic device assembly, comprising an electronic device and a stylus, comprising:

a barrel assembly and a tip assembly, wherein the tip assembly is located at an end of the barrel assembly and a gap is present between the tip assembly and the barrel assembly;

a first electrode, a second electrode, a signal board, a mainshaft, a pressure sensor assembly, a control board, and a flexible electrical connection assembly, wherein one end of the first electrode is located at a writing end of the tip assembly, the signal board extends into the tip assembly and connects to another end of the first electrode, and the second electrode fits around the signal board and is electrically connected to the signal board, and wherein the pressure sensor assembly is fixed in the barrel assembly, one end of the mainshaft is connected to the tip assembly, another end of the mainshaft is coupled to the pressure sensor assembly to transfer pressure from the tip assembly to the pressure sensor assembly, the pressure sensor assembly is electrically connected to the control board, one end of the flexible electrical connection assembly is connected to the signal board, another end of the flexible electrical connection assembly is electrically connected to the control board, and a bending portion is present between the one end and the another end of the flexible electrical connection assembly, and wherein the flexible electrical connection assembly comprises a flexible circuit board and an electrical connector, with the electrical connector connected to an end of the flexible circuit board facing towards the control board and the bending portion located on the flexible circuit board, and wherein the pressure sensor assembly comprises a pressure sensor and an electrical connecting member, wherein one side surface of the pressure sensor abuts against an end of the mainshaft, the electrical connecting member is connected to another side surface of the pressure sensor, and the electrical connecting member is electrically connected to the control board; and a fixed bracket, wherein the fixed bracket is fixed in the barrel assembly and the fixed bracket comprises a main body with an accommodating chamber, an opening of the accommodating chamber facing the mainshaft and the pressure sensor assembly being located in the accommodating chamber; and an insulating sleeve, wherein the insulating sleeve fits around the signal board, the second electrode fits around an outer wall of the insulating sleeve, and the insulating sleeve extends partly into the mainshaft and connects to the mainshaft, wherein a first through hole is provided in the insulating sleeve, a first conductive member fits around the signal board, and the second electrode extends partly into the first through hole and touches the first conductive member, and wherein a limit bar is provided at an end of a fixed sleeve facing towards the fixed bracket, a limit recess is provided in a side wall of the main body of the fixed bracket, and the limit bar snaps into the limit recess.

13. The electronic device assembly according to claim 12, further comprising a wireless keyboard, wherein the wireless keyboard has an accommodating portion for accommodating the stylus.

14. A stylus comprising:
a barrel assembly and a tip assembly, wherein the tip assembly is located at an end of the barrel assembly and a gap is present between the tip assembly and the barrel assembly;
a first electrode, a second electrode, a signal board, a mainshaft, a pressure sensor assembly, a control board, and a flexible electrical connection assembly,
wherein one end of the first electrode is located at a writing end of the tip assembly, the signal board extends into the tip assembly and connects to another end of the first electrode, and the second electrode fits around the signal board and is electrically connected to the signal board, and
wherein the pressure sensor assembly is fixed in the barrel assembly, one end of the mainshaft is connected to the tip assembly, another end of the mainshaft is coupled to the pressure sensor assembly to transfer pressure from the tip assembly to the pressure sensor assembly, the pressure sensor assembly is electrically connected to the control board, one end of the flexible electrical connection assembly is connected to the signal board, another end of the flexible electrical connection assembly is electrically connected to the control board, and a bending portion is present between the one end and the another end of the flexible electrical connection assembly, and
wherein the flexible electrical connection assembly comprises a flexible circuit board and an electrical connector, with the electrical connector connected to an end of the flexible circuit board facing towards the control board and the bending portion located on the flexible circuit board, and
wherein the pressure sensor assembly comprises a pressure sensor and an electrical connecting member, wherein one side surface of the pressure sensor abuts against an end of the mainshaft, the electrical connecting member is connected to another side surface of the pressure sensor, and the electrical connecting member is electrically connected to the control board;
a fixed bracket, wherein the fixed bracket is fixed in the barrel assembly and the fixed bracket comprises a main body with an accommodating chamber, an opening of the accommodating chamber facing the mainshaft and the pressure sensor assembly being located in the accommodating chamber; and
an insulating sleeve, wherein the insulating sleeve fits around the signal board, the second electrode fits around an outer wall of the insulating sleeve, and the insulating sleeve extends partly into the mainshaft and connects to the mainshaft, wherein a first through hole is provided in the insulating sleeve, a first conductive member fits around the signal board, and the second electrode extends partly into the first through hole and touches the first conductive member, and
wherein a first mounting hole is provided in a side wall of the mainshaft, a second mounting hole is provided in a side wall of a fixed sleeve, the second mounting hole communicates with the first mounting hole, and an end of the flexible electrical connection assembly extends into the mainshaft through the second mounting hole and the first mounting hole and connects to the signal board.

15. The stylus according to claim 14, wherein central axes of the mainshaft and the pressure sensor both coincide with a central axis of the barrel assembly.

16. The stylus according to claim 14, wherein the pressure sensor assembly further comprises a buffer and the buffer fits onto a side surface of the electrical connecting member facing away from the pressure sensor.

17. The stylus according to claim 15, wherein the fixed bracket further comprises a support plate, the support plate is connected to a side of the main body facing away from the mainshaft, and an end of the control board is connected to the support plate.

18. The stylus according to claim 14, further comprising a ground electrode, wherein the ground electrode fits around the outer wall of the insulating sleeve and the ground electrode is located on a side of the second electrode closer to the first electrode, wherein
a second through hole is provided in the insulating sleeve, a second conductive member fits around the signal board, and the ground electrode extends partly into the second through hole and touches the second conductive member.

19. The stylus according to claim 18, wherein the fixed sleeve is fixed in the barrel assembly, the mainshaft extends into the fixed sleeve, and a first limit part is provided on an outer wall of the mainshaft at an end facing towards the tip assembly, wherein the first limit part is configured to abut against an end of the fixed sleeve facing towards the tip assembly when the tip assembly is moving towards the barrel assembly.

20. The stylus according to claim 14, wherein a limit bar is provided at an end of the fixed sleeve facing towards the fixed bracket, a limit recess is provided in a side wall of the main body of the fixed bracket, and the limit bar snaps into the limit recess.

* * * * *